US008706392B2

(12) United States Patent
Koike

(10) Patent No.: US 8,706,392 B2

(45) Date of Patent: Apr. 22, 2014

(54) DISTANCE DETECTION DEVICE AND COLLISION DETERMINATION DEVICE

(75) Inventor: Shin Koike, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 12/808,279

(22) PCT Filed: May 7, 2009

(86) PCT No.: PCT/JP2009/002005

§ 371 (c)(1), (2), (4) Date: Jun. 15, 2010

(87) PCT Pub. No.: WO2010/128537

PCT Pub. Date: Nov. 11, 2010

(65) Prior Publication Data

US 2012/0143486 A1 Jun. 7, 2012

(51) Int. Cl.

*G08G 1/16* (2006.01)

*G06F 17/00* (2006.01)

(52) U.S. Cl.

USPC ........... 701/301; 701/300; 307/9.1; 307/10.1; 340/903; 342/458

(58) Field of Classification Search

USPC ........... 701/300, 301; 307/9.1, 10.1; 340/903; 342/458

See application file for complete search history.

(56) References Cited

U.S. PATENT DOCUMENTS 6,249,232 B1 6/2001 Tamura et al.

(Continued)

FOREIGN PATENT DOCUMENTS

DE 699 08 628 T2 5/2004

DE 699 32 287 T2 11/2006

(Continued)

OTHER PUBLICATIONS

International Search Report issued Jun. 16, 2009 in PCT/JP09/002005 filed May 7, 2009.

*Primary Examiner* — Thomas Black

*Assistant Examiner* — Sara Lewandroski

(74) *Attorney, Agent, or Firm* — Oblon, Spivak, McClelland, Maier & Neustadt, L.L.P.

(57) ABSTRACT

A collision determination ECU (1) includes: a first information generation section (101) that acquires time information from a timer (4) every predetermined time period PA, and associates own vehicle time information representing an own vehicle time, which is the acquired time information, with own vehicle identification information, to thereby generate first output information; a transmission control section (102) that transmits the generated first output information by broadcasting; a reception control section (103) that receives own vehicle time information representing an own vehicle time and own vehicle identification information, which are included in first output information from an other vehicle VCB, as other vehicle time information representing an other vehicle time and other vehicle identification information, respectively; a reception time acquisition section (104) that acquires reception time information representing a reception time from the timer (4), when the first output information is received by the other vehicle VCB; and a distance calculation section (105) that obtains a distance to the other vehicle, based on the other vehicle time information included in the received first output information and the acquired reception time information. In this manner, a distance to a vehicle in a wide range is accurately detected through car-to-car communication.

21 Claims, 14 Drawing Sheets

(56) References Cited

U.S. PATENT DOCUMENTS

| | | | | |
|---|---|---|---|---|
| 6,373,434 | B1 * | 4/2002 | Hayakawa | 342/387 |
| 6,611,233 | B2 * | 8/2003 | Kimura | 342/458 |
| 6,741,863 | B1 * | 5/2004 | Chiang et al. | 455/456.1 |
| 6,944,543 | B2 * | 9/2005 | Prakah-Asante et al. | 701/301 |
| 7,609,197 | B2 * | 10/2009 | Tsunehara et al. | 342/47 |
| 7,873,099 | B2 * | 1/2011 | Fullerton et al. | 375/149 |
| 8,041,469 | B2 * | 10/2011 | Kellum et al. | 700/300 |
| 8,077,077 | B2 * | 12/2011 | Sakuma | 342/70 |
| 8,289,186 | B2 * | 10/2012 | Osafune | 340/903 |
| 2003/0009275 | A1 * | 1/2003 | Koike | 701/93 |
| 2007/0164896 | A1 * | 7/2007 | Suzuki et al. | 342/70 |

FOREIGN PATENT DOCUMENTS

| | | | |
|---|---|---|---|
| EP | 1134593 | A1 * | 9/2001 |
| JP | 63 266375 | | 11/1988 |
| JP | 05122120 | A * | 5/1993 |
| JP | 6 216877 | | 8/1994 |
| JP | 9 35185 | | 2/1997 |
| JP | 2001 251235 | | 9/2001 |
| JP | 2004 178028 | | 6/2004 |
| JP | 2005 51466 | | 2/2005 |
| JP | 2005 241486 | | 9/2005 |
| JP | 2008 249550 | | 10/2008 |
| JP | 2009 18680 | | 1/2009 |

* cited by examiner

DISTANCE DETECTION DEVICE AND COLLISION DETERMINATION DEVICE

TECHNICAL FIELD

The present invention relates to, for example, a distance detection device that is mounted in a vehicle and detects a distance to an other vehicle through information communicated with the other vehicle. The present invention also relates to, for example, a collision determination device that is mounted in a vehicle and determines a possibility of a collision with an other vehicle through information communicated with the other vehicle.

BACKGROUND ART

Conventionally, a technique of communicating various types of information through car-to-car communication has been proposed and practical use thereof is under consideration. Thus, various methods, devices, and the like, for detecting a distance through car-to-car communication are disclosed (see Patent Literature 1, for example).

In a communication device disclosed in Patent Literature 1: a common spreading code, which is common to a plurality of vehicles and used for transmissing information, is generated; a spreading code for distance measurement, which is different from the common spreading code, unique to each vehicle, and used for distance measurement, is generated; a code obtained by applying spread spectrum processing to information by using the common spreading code and the spreading code for distance measurement are summed; a result of the summing is converted into a radio band signal and transmitted into the air; a radio band signal reflected from the other vehicle or other objects is received and converted into a spread band signal; despreading is performed by using the spreading code for distance measurement; and distance measurement is performed based on a code obtained by the despreading.

In this communication device: a spreading code, which is unique to each vehicle and used exclusively for distance measurement, is provided separately from the common spreading code which is used for transmission of information; and this spreading code, which is constantly (periodically) generated, is transmitted while being added to an information signal which has been spread by the common spreading code. This enables distance measurement to be constantly and continuously performed while information is transmitted based on the CSMA/CA (Carrier Sense Multiple Access with Collision Avoidance).

CITATION LIST

Patent Literature

Patent Literature 1: Japanese Laid-Open Patent Publication No. 2001-251235

SUMMARY OF INVENTION

Technical Problem

However, in the communication device disclosed in Patent Literature 1, the distance measurement is performed by receiving the radio band signal reflected from the other vehicle or the other objects, and therefore it is difficult to obtain a sufficiently wide range, as a range over which the distance measurement can be performed. That is, since the distance measurement is performed by receiving the radio band signal reflected from the other vehicle or the other objects, not only the attenuation caused when the signal is transmitted from the own vehicle to the other vehicle or the other objects and the attenuation caused when a reflected wave from the other vehicle or the other object arrives at the own vehicle, but also the attenuation caused by the radio wave being reflected from the other vehicle or the other objects, occurs.

The present invention is made in view of the circumstances described above, and an object of the present invention is to provide a distance detection device and a collision determination device, which are capable of accurately detecting a distance to a vehicle in a wide range through car-to-car communication.

Solution to Problem

The present invention has the following features to attain the object mentioned above. A first aspect of the present invention is directed to a distance detection device which is mounted in a vehicle and detects a distance to an other vehicle through information communicated with the other vehicle. The distance detection device includes: a time measurement part having a time measurement function; a first information generation part for generating first output information which is information to be transmitted to the other vehicle, by acquiring time information from the time measurement part and associating own vehicle time information representing an own vehicle time, which is the acquired time information, with own vehicle identification information, which is predetermined identification information of an own vehicle; a transmission part for, each time the first information generation part generates the first output information, transmitting the generated first output information by broadcasting; a reception part for receiving own vehicle time information representing an own vehicle time and own vehicle identification information, which are included in first output information transmitted from the other vehicle by broadcasting, as other vehicle time information which represents an other vehicle time of the other vehicle and other vehicle identification information which is identification information of the other vehicle, respectively; a reception time acquisition part for, when the reception part receives the first output information from the other vehicle, acquiring, from the time measurement part, time information as reception time information representing a reception time; and a distance calculation part for obtaining a distance to the other vehicle, based on the other vehicle time information included in the first output information received by the reception part, and the reception time information acquired by the reception time acquisition part.

In a second aspect of the present invention based on the first aspect, when the reception part receives the first output information from the other vehicle, the transmission part transmits, by broadcasting, the reception time information acquired by the reception time acquisition part.

In a third aspect of the present invention based on the first aspect: the distance detection device includes a time difference calculation part for, when the reception part receives the first output information from the other vehicle, obtaining, as a first time difference, a time difference resulting from the other vehicle time included in the first output information being subtracted from the reception time acquired by the reception time acquisition part; and the distance calculation part obtains a distance to the other vehicle, based on first time difference information representing the first time difference obtained by the time difference calculation part.

In a fourth aspect of the present invention based on the first aspect: the distance detection device includes a time difference calculation part for, when the reception part receives the first output information from the other vehicle, obtaining, as a first time difference, a time difference resulting from the other vehicle time included in the first output information being subtracted from the reception time acquired by the reception time acquisition part; and the distance calculation part obtains a distance to the other vehicle, by exchanging, with the other vehicle, first time difference information representing the first time difference obtained by the time difference calculation part.

In a fifth aspect of the present invention based on the third aspect: the distance detection device includes a second information generation part for, when the reception part receives the first output information, generating second output information, by associating the first time difference information representing the first time difference obtained by the time difference calculation part, with the other vehicle identification information received by the reception part; when the second information generation part generates the second output information, the transmission part transmits, by broadcasting or communication, the generated second output information simultaneously with the first output information generated by the first information generation part; the reception part receives first output information and second output information transmitted from the other vehicle by broadcasting or communication; and when the reception part receives the first output information and the second output information from the other vehicle, the reception time acquisition part acquires, from the time measurement part, time information as reception time information representing a reception time.

In a sixth aspect of the present invention based on the fifth aspect: the distance detection device includes a first determination part for, when the reception part receives the second output information from the other vehicle, determining whether or not other vehicle identification information included in the received second output information is coincident with the own vehicle identification information; and when the first determination part determines that the other vehicle identification information is coincident with the own vehicle identification information, the distance calculation part obtains a distance to the other vehicle, based on second time difference information representing a second time difference, which is first time difference information included in the second output information received by the reception part.

In a seventh aspect of the present invention based on the sixth aspect, the distance calculation part obtains a distance to the other vehicle, by: obtaining an average value of the first time difference obtained by the time difference calculation part and the second time difference included in the second output information received by the reception part; and multiplying the obtained average value by the speed of light.

In an eighth aspect of the present invention based on the sixth aspect, the distance detection device includes: a time measurement lag storage part for storing therein time measurement lag information representing a time measurement lag, which is a difference in measurement time between a time measurement part mounted in the other vehicle and the time measurement part mounted in the own vehicle, so as to associate the time measurement lag information with the other vehicle identification information of the other vehicle; a time measurement lag calculation part for, when the first determination part determines that the other vehicle identification information is coincident with the own vehicle identification information, obtaining, as the time measurement lag, one half of a difference resulting from the first time difference obtained by the time difference calculation part being subtracted from the second time difference included in the second output information received by the reception part; and a time measurement lag recording part for, when the first determination part determines that the other vehicle identification information is coincident with the own vehicle identification information, recording, in the time measurement lag storage part, the time measurement lag information representing the time measurement lag obtained by the time measurement lag calculation part so as to associate the time measurement lag information with the other vehicle identification information included in the first output information received simultaneously with the second output information.

In a ninth aspect of the present invention based on the eighth aspect, the distance detection device includes an inhibition part for, when the first determination part determines that the other vehicle identification information is coincident with the own vehicle identification information, performing at least one of determinations of: whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information received simultaneously with the second output information received by the reception part, is equal to or greater than a second predetermined number of times which is not less than 1, The inhibition part inhibits the second information generation part from generating the second output information, when at least one of the determinations that the number of times is equal to or greater than the first predetermined number of times and that the number of times is equal to or greater than the second predetermined number of times is made.

In a tenth aspect of the present invention based on the eighth aspect: the distance detection device includes a second determination part for, when the reception part receives the first output information from the other vehicle, determining whether or not the other vehicle identification information included in the received first output information is coincident with any of the other vehicle identification information stored in the time measurement lag storage part; and when the second determination part determines that the other vehicle identification information is coincident with any of the other vehicle identification information stored in the time measurement lag storage part, the distance calculation part reads, from the time measurement lag storage part, the time measurement lag information corresponding to the other vehicle identification information included in the first output information received by the reception part, and obtains a distance to the other vehicle based on the time measurement lag information which has been read.

In an eleventh aspect of the present invention based on the tenth aspect, the distance calculation part obtains a distance to the other vehicle by: obtaining a sum of the first time difference obtained by the time difference calculation part and the time measurement lag read from the time measurement lag storage part; and multiplying the obtained sum by the speed of light.

In a twelfth aspect of the present invention based on the sixth aspect, the distance detection device includes: a time difference storage part for storing therein the second time difference information included in the second output information transmitted from the other vehicle, so as to associate the second time difference information with the other vehicle identification information; and a time difference recording part for, when the first determination part determines that the other vehicle identification information is coincident with the own vehicle identification information, recording, in the time difference storage part, the second time difference information included in the second output information received by the reception part so as to associate the second time difference information with the other vehicle identification information included in the first output information received simultaneously with the second output information.

In a thirteenth aspect of the present invention based on the twelfth aspect: the distance detection device includes an inhibition part for, when the first determination part determines that the other vehicle identification information is coincident with the own vehicle identification information, performing at least one of determinations of: whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information received simultaneously with the second output information received by the reception part, is equal to or greater than a second predetermined number of times which is not less than 1. The inhibition part inhibits the second information generation part from generating the second output information, when at least one of the determinations that the number of times is equal to or greater than the first predetermined number of times and that the number of times is equal to or greater than the second predetermined number of times is made.

In a fourteenth aspect of the present invention based on the twelfth aspect: the distance detection device includes a second determination part for, when the reception part receives the first output information from the other vehicle, determining whether or not the other vehicle identification information included in the received first output information is coincident with any of the other vehicle identification information stored in the time difference storage part; and when the second determination part determines that the other vehicle identification information is coincident with any of the other vehicle identification information stored in the time difference storage part, the distance calculation part reads, from the time difference storage part, the second time difference information corresponding to the other vehicle identification information included in the first output information received by the reception part, and obtains a distance to the other vehicle based on the second time difference information which has been read.

In a fifteenth aspect of the present invention based on the fourteenth aspect, the distance calculation part obtains a distance to the other vehicle by: obtaining an average value of the first time difference obtained by the time difference calculation part and the second time difference read from the time difference storage part; and multiplying the obtained average value by the speed of light.

A sixteenth aspect of the present invention is directed to a collision determination device which is mounted in a vehicle and determines a possibility of a collision with an other vehicle through information communicated with the other vehicle. The collision determination device includes: a time measurement part having a time measurement function; a first information generation part for generating first output information which is information to be transmitted to the other vehicle, by acquiring time information from the time measurement part and associating own vehicle time information representing an own vehicle time, which is the acquired time information, with own vehicle identification information, which is predetermined identification information of an own vehicle; a transmission part for, each time the first information generation part generates the first output information, transmitting the generated first output information by broadcasting; a reception part for receiving own vehicle time information representing an own vehicle time and own vehicle identification information, which are included in first output information transmitted from the other vehicle by broadcasting, as other vehicle time information which represents an other vehicle time of the other vehicle and other vehicle identification information which is identification information of the other vehicle, respectively; a reception time acquisition part for, when the reception part receives the first output information from the other vehicle, acquiring, from the time measurement part, time information as reception time information representing a reception time; a distance calculation part for obtaining a distance to the other vehicle, based on the other vehicle time information included in the first output information received by the reception part, and the reception time information acquired by the reception time acquisition part; and a collision determination part for determining whether or not there is a high possibility of a collision with the other vehicle, based on the distance obtained by the distance calculation part.

In a seventeenth aspect of the present invention based on the sixteenth aspect: the collision determination device includes a collision prediction part for estimating a collision time at which a collision with the other vehicle is predicted to occur, based on the distance obtained by the distance calculation part; and the collision determination part determines whether or not there is a high possibility of a collision with the other vehicle, based on the collision time estimated by the collision prediction part.

In an eighteenth aspect of the present invention based on the seventeenth aspect, the collision prediction part estimates the collision time, based on a change with time of the distance obtained by the distance calculation part.

In a nineteenth aspect of the present invention based on the seventeenth aspect: the collision determination device includes a direction detection part for obtaining, based on the own vehicle as a reference, a direction in which the other vehicle, to which the distance has been obtained by the distance calculation part, is present; and the collision prediction part determines whether or not there is a high possibility of a collision with the other vehicle, based on the collision time estimated by the collision prediction part and the direction in which the other vehicle is present, which has been obtained by the direction detection part.

In a twentieth aspect of the present invention based on the nineteenth aspect, the direction detection part obtains the direction in which the other vehicle is present, based on a direction from which a radio wave signal of the other vehicle comes.

In a twenty-first aspect of the present invention based on the twentieth aspect: the collision determination device includes a plurality of antennas for receiving radio wave signals; and the direction detection part obtains a direction from which the radio wave signals of the other vehicle come, based on a phase difference between the radio wave signals received from the other vehicle by the plurality of antennas.

In a twenty-second aspect of the present invention based on the nineteenth aspect, the collision determination part determines that there is a high possibility of a collision with the other vehicle, when a time period until the collision time is equal to or less than a predetermined threshold value and in addition an azimuth change rate, which indicates the degree of change, per unit time, of the direction in which the other vehicle is present, is equal to or less than a predetermined threshold value.

Advantageous Effects of Invention

According to the first aspect, a time measurement part measures time. Time information is acquired from the time measurement part. Own vehicle time information representing an own vehicle time, which is the acquired time information, is associated with own vehicle identification information, which is predetermined identification information of an own vehicle, and thereby first output information which is information to be transmitted to the other vehicle is generated. Each time the output information is generated, the generated first output information is transmitted by broadcasting. Furthermore, own vehicle time information representing an own vehicle time and own vehicle identification information, which are included in first output information transmitted from the other vehicle by broadcasting, are received as other vehicle time information which represents an other vehicle time of the other vehicle and other vehicle identification information which is identification information of the other vehicle, respectively. When the first output information is received from the other vehicle, time information is acquired from the time measurement part, as reception time information representing a reception time. A distance to the other vehicle is obtained, based on the other vehicle time information included in the received first output information, and the acquired reception time information. Therefore, a distance to a vehicle in a wide range can accurately be detected through car-to-car communication.

That is, the other vehicle time information is information representing a transmission time measured by a time measurement part of the other vehicle, and the reception time information is information representing a reception time measured by the time measurement part of the own vehicle. Accordingly, in a case where it is possible to correct a measured time lag between the time measurement part of the other vehicle and the time measurement part of the own vehicle, the distance to the other vehicle can accurately be detected.

In addition, the distance to the other vehicle is detected not by receiving a radio wave reflected from the other vehicle, but by receiving a radio wave transmitted from the other vehicle. Therefore, a distance to a vehicle in a wide range can be detected.

According to the second aspect, when the first output information is received from the other vehicle, the reception time information acquired from the time measurement part is transmitted by broadcasting. Therefore, a distance to a vehicle in a wide range can accurately be detected through car-to-car communication.

That is, the reception time information, which corresponds to a time at which the first output information transmitted from the other vehicle is received by the own vehicle, is transmitted. Therefore, if the reception time information is received by the other vehicle, the distance to the own vehicle can be obtained, in the other vehicle, based on the reception time information. Thus, the distance to the own vehicle can accurately be detected.

According to the third aspect, when the first output information is received from the other vehicle, a time difference resulting from the other vehicle time included in the first output information being subtracted from the acquired reception time is obtained as a first time difference. In addition, based on first time difference information representing the obtained first time difference, the distance to the other vehicle is obtained. Therefore, the distance to the other vehicle can be detected with an increased accuracy.

That is, the other vehicle time information is information representing a transmission time measured by the time measurement part of the other vehicle, and the reception time information is information representing a reception time measured by the time measurement part of the own vehicle. Accordingly, the first time difference, which is the time difference resulting from the other vehicle time being subtracted from the reception time, corresponds to a time period required for a radio wave to be transmitted from the other vehicle to the own vehicle. Therefore, in a case where it is possible to correct a measured time lag between the time measurement part of the other vehicle and the time measurement part of the own vehicle, the distance to the other vehicle can accurately be detected based on the first time difference.

According to the fourth aspect, when the first output information is received from the other vehicle, a time difference resulting from the other vehicle time included in the first output information being subtracted from the acquired reception time is obtained as a first time difference. In addition, a distance to the other vehicle is obtained by first time difference information representing the obtained first time difference being exchanged with that of the other vehicle. Therefore, the distance to the other vehicle can be detected with an increased accuracy.

That is, since the distance to the other vehicle is obtained by the first time difference information being exchanged with that of the other vehicle, a measured time lag between the time measurement part of the other vehicle and the time measurement part of the own vehicle can be corrected. Thus, the distance to the other vehicle can be detected with an increased accuracy.

According to the fifth aspect, when the first output information is received, the first time difference information representing the obtained first time difference is associated with the received other vehicle identification information, and thereby second output information is generated. When the second output information is generated, the generated second output information is transmitted by broadcasting simultaneously with the generated first output information. In addition, first output information and second output information transmitted from the other vehicle by broadcasting are received. When the first output information and the second output information are received from the other vehicle, time information is acquired from the time measurement part, as reception time information representing a reception time. As a result, a measured time lag between the time measurement part of the other vehicle and the time measurement part of the own vehicle can be corrected. Thus, the distance to the other vehicle can accurately be detected.

That is, first time difference included in the second output information generated in the other vehicle corresponds to a time period required for a radio wave to be transmitted from the own vehicle to the other vehicle. In addition, the time difference resulting from the other vehicle time included in the first output information being subtracted from the reception time corresponds to a time period required for a radio wave to be transmitted from the other vehicle to the own vehicle. Therefore, the measured time lag between the time measurement part of the other vehicle and the time measurement part of the own vehicle can be corrected.

Specifically, when the time measurement part of the other vehicle is delayed behind the time measurement part of the own vehicle by a time $\Delta T$, the first time difference included in the second output information is longer, by the time ΔT, than the time period required for a radio wave to be transmitted from the own vehicle to the other vehicle. On the other hand, the time difference resulting from the other vehicle time included in the first output information being subtracted from the reception time is shorter, by the time ΔT, than the time period required for a radio wave to be transmitted from the other vehicle to the own vehicle. Thus, the measured time lag between the time measurement part of the other vehicle and the time measurement part of the own vehicle can be corrected.

According to the sixth aspect, when the second output information is received from the other vehicle, whether or not other vehicle identification information included in the received second output information is coincident with the own vehicle identification information is determined. When it is determined that the other vehicle identification information is coincident with the own vehicle identification information, a distance to the other vehicle is obtained, based on second time difference information representing a second time difference, which is first time difference information included in the received second output information. Therefore, a measured time lag between the time measurement part of the other vehicle and the time measurement part of the own vehicle can be corrected. Thus, the distance to the other vehicle can accurately be detected.

That is, when the other vehicle identification information included in the second output information is coincident with the own vehicle identification information, a second time difference included in the second output information corresponds to the time period required for a radio wave to be transmitted from the own vehicle to the other vehicle. The first time difference, which is a time difference resulting from the other vehicle time included in the first output information being subtracted from the reception time, corresponds to the time period required for a radio wave to be transmitted from the other vehicle to the own vehicle. Therefore, a measured time lag between the time measurement part of the other vehicle and the time measurement part of the own vehicle can be corrected.

Specifically, when the time measurement part of the other vehicle is delayed behind the time measurement part of the own vehicle by a time ΔT, the second time difference is longer, by the time ΔT, than the time period required for a radio wave to be transmitted from the own vehicle to the other vehicle. On the other hand, the first time difference is shorter, by the time ΔT, than the time period required for a radio wave to be transmitted from the other vehicle to the own vehicle. Thus, the measured time lag between the time measurement part of the other vehicle and the time measurement part of the own vehicle can be corrected.

According to the seventh aspect, a distance to the other vehicle is obtained by: obtaining an average value of the obtained first time difference and the second time difference included in the received second output information; and multiplying the obtained average value by the speed of light. Therefore, a measured time lag between the time measurement part of the other vehicle and the time measurement part of the own vehicle can be corrected. Thus, the distance to the other vehicle can accurately be detected.

That is, the sum of the first time difference and the second time difference is the same as the sum of the time period required for a radio wave to be transmitted from the other vehicle to the own vehicle, and the time period required for a radio wave to be transmitted from the own vehicle to the other vehicle. Thus, by multiplying, by the speed of light, the average value of the first time difference and the second time difference, the distance to the other vehicle can accurately be obtained.

Specifically, when the time measurement part of the other vehicle is adhead of the time measurement part of the own vehicle by a time ΔT, the second time difference is longer, by the time ΔT, than the time period required for a radio wave to be transmitted from the own vehicle to the other vehicle. On the other hand, the first time difference is shorter, by the time ΔT, than the time period required for a radio wave to be transmitted from the other vehicle to the own vehicle. Therefore, by summing the first time difference and the second time difference, the influence of the time ΔT can be cancelled. Thus, the distance to the other vehicle can accurately be obtained.

According to the eighth aspect, when it is determined that the other vehicle identification information included in the received second output information is coincident with the own vehicle identification information, one half of a difference resulting from the first time difference being subtracted from the second time difference included in the received second output information is obtained as a time measurement lag which is a difference in measurement time between the time measurement part mounted in the other vehicle and the time measurement part mounted in own vehicle. When it is determined that the other vehicle identification information included in the received second output information is coincident with the own vehicle identification information, time measurement lag information representing the obtained time measurement lag is recorded, in a time measurement lag storage part, so as to be associated with the other vehicle identification information included in the first output information received simultaneously with the second output information. Thus, a distance to the other vehicle can accurately be detected through a simple process.

Specifically, when the time measurement part of the other vehicle is delayed behind the time measurement part of the own vehicle by a time ΔT, the second time difference is longer, by the time ΔT, than the time period required for a radio wave to be transmitted from the own vehicle to the other vehicle. On the other hand, the first time difference is shorter, by the time ΔT, than the time period required for a radio wave to be transmitted from the other vehicle to the own vehicle. Thus, in a case where there is a small change of the distance during a period from a time point when the first output information is transmitted to a time point when the second output information is received from the other vehicle (in a case where the time period required for a radio wave to be transmitted from the own vehicle to the other vehicle is substantially the same as the time period required for a radio wave to be transmitted from the other vehicle to the own vehicle), the one half of the difference resulting from the first time difference being subtracted from the second time difference is substantially the same as the time ΔT. Thus, a measured time lag between the time measurement part mounted in the other vehicle and the time measurement part mounted in the own vehicle can be corrected. Therefore, in the subsequent process, the distance to the other vehicle can accurately be detected through a simple configuration.

According to the ninth aspect, when it is determined that the other vehicle identification information included in the received second output information is coincident with the own vehicle identification information, at least one of the following determinations is performed: whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information received simultaneously with the second output information received by the reception part, is equal to or greater than a second predetermined number of times which is not less than 1. When at least one of the determinations that the number of times is equal to or greater than the first predetermined number of times and that the number of times is equal to or greater than the second predetermined number of times is made, generation of the second output information is inhibited. Therefore, the distance to the other vehicle can be detected with an increased accuracy.

That is, when it is determined that the other vehicle identification information included in the received second output information is coincident with the own vehicle identification information, the time measurement lag information corresponding to the own vehicle identification information included in the first output information received simultaneously with the second output information is recorded in the time measurement lag storage part. Based on this time measurement lag information, the distance to the other vehicle corresponding to the aforesaid own vehicle identification information is obtained. Thus, in order that the own vehicle obtains the distance to the other vehicle corresponding to the aforesaid own vehicle identification information, it is not necessary to receive the second output information from the other vehicle corresponding to the aforesaid own vehicle identification information.

In a case where the number of times it is determined that the other vehicle identification information included in the received second output information is coincident with the own vehicle identification information is equal to or greater than the first predetermined number of times which is not less than 2; if the first predetermined number of times is set to an appropriate number of times, it is estimated that the other vehicle corresponding to the aforesaid other vehicle identification information has already received the second output information transmitted from the own vehicle. Moreover, in a case where the number of times the second output information, which includes, as the other vehicle identification information, the own vehicle identification information included in the first output information received simultaneously with the received second output information, is transmitted, is equal to or greater than the second predetermined number of times which is not less than 1; if the second predetermined number of times is set to an appropriate number of times, it is estimated that the other vehicle corresponding to the aforesaid other vehicle identification information has already received the second output information transmitted from the own vehicle. Therefore, in these cases, it is estimated that, in the other vehicle corresponding to the aforesaid other vehicle identification information, the time measurement lag information corresponding to the own vehicle identification information is recorded in the time measurement lag storage part and the distance to the own vehicle is obtained based on this time measurement lag information. Therefore, it is not necessary to transmit the second output information to the other vehicle corresponding to the aforesaid other vehicle identification information.

Furthermore, when the number of times it is determined that the other vehicle identification information included in the received second output information is coincident with the own vehicle identification information is equal to or greater than the first predetermined number of times which is not less than 2, or when the number of times the second output information is transmitted is equal to or greater than the second predetermined number of times, the second output information is not generated, and therefore only the first output information is transmitted. As a result, the amount of information transmitted and received can be reduced, and thus the frequency of transmission and reception can be increased. This enables the distance to the other vehicle to be detected with an increased accuracy.

According to the tenth aspect, when the first output information is received from the other vehicle, whether or not the other vehicle identification information included in the received first output information is coincident with any of the other vehicle identification information stored in the time measurement lag storage part is determined. When it is determined that the other vehicle identification information is coincident with any of the other vehicle identification information stored in the time measurement lag storage part, the time measurement lag information corresponding to the other vehicle identification information included in the received first output information is read from the time measurement lag storage part, and a distance to the other vehicle is obtained based on the time measurement lag information which has been read. Therefore, by a simple configuration, the distance to the other vehicle can be detected with an increased accuracy.

That is, the time measurement lag information which is stored in the time measurement lag storage part and corresponds to the other vehicle identification information included in the first output information is information representing a measured time lag between the time measurement part mounted in the other vehicle and the time measurement part mounted in the own vehicle. Thus, the measured time lag between the time measurement part mounted in the other vehicle and the time measurement part mounted in the own vehicle can be corrected. Therefore, by a simple configuration, the distance to the other vehicle can be detected with an increased accuracy.

According to the eleventh aspect, a distance to the other vehicle is obtained by: obtaining a sum of the obtained first time difference and the time measurement lag read from the time measurement lag storage part; and multiplying the obtained sum by the speed of light. Therefore, by a simple configuration, the distance to the other vehicle can be detected with an increased accuracy.

That is, when the time measurement part of the other vehicle is delayed behind the time measurement part of the own vehicle by a time $\Delta T$, the first time difference is shorter, by the time $\Delta T$, than the time period required for a radio wave to be transmitted from the other vehicle to the own vehicle. Therefore, by summing the first time difference and the time measurement lag read from the time measurement lag storage part, the time period required for a radio wave to be transmitted from the other vehicle to the own vehicle can be obtained. Thus, by a simple configuration, the distance to the other vehicle can be detected with an increased accuracy.

According to the twelfth aspect, when it is determined that the other vehicle identification information included in the second output information received from the other vehicle is coincident with the own vehicle identification information, the second time difference information included in the received second output information is recorded in the time difference storage part so as to be associated with the other vehicle identification information included in the first output information received simultaneously with the second output information. Thus, the distance to the other vehicle can accurately be detected through a simple process.

That is, when the time measurement part of the other vehicle is delayed behind the time measurement part of the own vehicle by a time ΔT, the second time difference is longer, by the time ΔT, than the time period required for a radio wave to be transmitted from the own vehicle to the other vehicle. On the other hand, the first time difference is shorter, by the time ΔT, than the time period required for a radio wave to be transmitted from the other vehicle to the own vehicle. Thus, the measured time lag between the time measurement part mounted in the other vehicle and the time measurement part mounted in the own vehicle can be corrected. Therefore, in the subsequent process, the distance to the other vehicle can accurately be detected by a simple configuration.

According to the thirteenth aspect, when it is determined that the other vehicle identification information included in the received second output information is coincident with the own vehicle identification information, at least one of the following determinations is performed: whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information which is received simultaneously with the second output information received by the reception part, is equal to or greater than a second predetermined number of times which is not less than 1. When at least one of the determinations that the number of times is equal to or greater than the first predetermined number of times and that the number of times is equal to or greater than the second predetermined number of times is made, generation of the second output information is inhibited. Therefore, the distance to the other vehicle can be detected with an increased accuracy.

That is, when it is determined that the other vehicle identification information included in the received second output information is coincident with the own vehicle identification information, the time measurement lag information corresponding to the own vehicle identification information included in the first output information received simultaneously with the second output information is recorded in the time measurement lag storage part. Based on this time measurement lag information, the distance to the other vehicle corresponding to the aforesaid own vehicle identification information is obtained. Thus, in order that the own vehicle obtains the distance to the other vehicle corresponding to the aforesaid own vehicle identification information, it is not necessary to receive the second output information from the other vehicle corresponding to the aforesaid own vehicle identification information.

In a case where the number of times it is determined that the other vehicle identification information included in the received second output information is coincident with the own vehicle identification information is equal to or greater than the first predetermined number of times which is not less than 2; if the first predetermined number of times is set to an appropriate number of times, it is estimated that the other vehicle corresponding to the aforesaid other vehicle identification information has already received the second output information transmitted from the own vehicle. Moreover, in a case where the number of times the second output information, which includes, as the other vehicle identification information, the own vehicle identification information included in the first output information received simultaneously with the received second output information, is transmitted, is equal to or greater than the second predetermined number of times which is not less than 1; if the second predetermined number of times is set to an appropriate number of times, it is estimated that the other vehicle corresponding to the aforesaid other vehicle identification information has already received the second output information transmitted from the own vehicle. Therefore, in these cases, it is estimated that, in the other vehicle corresponding to the aforesaid other vehicle identification information, the time measurement lag information corresponding to the own vehicle identification information is recorded in the time measurement lag storage part and the distance to the own vehicle is obtained based on this time measurement lag information. Therefore, it is not necessary to transmit the second output information to the other vehicle corresponding to the aforesaid other vehicle identification information.

Furthermore, when the number of times it is determined that the other vehicle identification information included in the received second output information is coincident with the own vehicle identification information is equal to or greater than the first predetermined number of times which is not less than 2, or when the number of times the second output information is transmitted is equal to or greater than the second predetermined number of times, the second output information is not generated, and therefore only the first output information is transmitted. As a result, the amount of information transmitted and received can be reduced, and thus the frequency of transmission and reception can be increased. This enables the distance to the other vehicle to be detected with an increased accuracy.

According to the fourteenth aspect, when the first output information is received from the other vehicle, whether or not the other vehicle identification information included in the received first output information is coincident with any of the other vehicle identification information stored in the time difference storage part is determined. When it is determined that the other vehicle identification information is coincident with any of the other vehicle identification information stored in the time difference storage part, the second time difference information corresponding to the other vehicle identification information included in the received first output information is read from the time difference storage part, and a distance to the other vehicle is obtained based on the second time difference information which has been read. Therefore, by a simple configuration, the distance to the other vehicle can be detected with an increased accuracy.

That is, when the time measurement part of the other vehicle is delayed behind the time measurement part of the own vehicle by a time ΔT, the second time difference that is stored in the time difference storage part and corresponds to the other vehicle identification information included in the first output information is longer, by the time ΔT, than the time period required for a radio wave to be transmitted from the own vehicle to the other vehicle. Thus, the measured time lag between the time measurement part mounted in the other vehicle and the time measurement part mounted in the own vehicle can be corrected, by using the second time difference. Therefore, by a simple configuration, the distance to the other vehicle can be detected with an increased accuracy.

According to the fifteenth aspect, a distance to the other vehicle is obtained by: obtaining an average value of the first time difference and the second time difference read from the time difference storage part; and multiplying the obtained average value by the speed of light. Therefore, by a simple configuration, the distance to the other vehicle can be detected with an increased accuracy.

That is, when the time measurement part of the other vehicle is delayed behind the time measurement part of the own vehicle by a time ΔT, the first time difference is shorter, by the time ΔT, than the time period required for a radio wave to be transmitted from the other vehicle to the own vehicle. Therefore, by summing the first time difference and the second time difference read from the time difference storage part, the influence of the time ΔT is cancelled. As a result, the sum of the time period required for a radio wave to be transmitted from the own vehicle to the other vehicle and the time period required for a radio wave to be transmitted from the other vehicle to the own vehicle can be obtained. Thus, by a simple configuration, the distance to the other vehicle can be detected with an increased accuracy.

According to the sixteenth aspect, a time measurement part measures time. Time information is acquired from the time measurement part. Own vehicle time information representing an own vehicle time, which is the acquired time information, is associated with own vehicle identification information, which is predetermined identification information of an own vehicle, and thereby first output information which is information to be transmitted to the other vehicle is generated. Each time the output information is generated, the generated first output information is transmitted by broadcasting. Furthermore, own vehicle time information representing an own vehicle time and own vehicle identification information, which are included in first output information transmitted from the other vehicle by broadcasting, are received as other vehicle time information which represents an other vehicle time of the other vehicle and other vehicle identification information which is identification information of the other vehicle, respectively. When the first output information is received from the other vehicle, time information is acquired from the time measurement part, as reception time information representing a reception time. A distance to the other vehicle is obtained, based on the other vehicle time information included in the received first output information, and the acquired reception time information. Moreover, whether or not there is a high possibility of a collision with the other vehicle is determined based on the obtained distance. Therefore, whether or not there is a high possibility of a collision with the other vehicle can accurately be estimated through car-to-car communication.

That is, the other vehicle time information is information representing a transmission time measured by a time measurement part of the other vehicle, and the reception time information is information representing a reception time measured by the time measurement part of the own vehicle. Accordingly, in a case where it is possible to correct a measured time lag between the time measurement part of the other vehicle and the time measurement part of the own vehicle, the distance to the other vehicle can accurately be detected.

In addition, the distance to the other vehicle is detected not by receiving a radio wave reflected from the other vehicle, but by receiving a radio wave transmitted from the other vehicle. Therefore, a distance to a vehicle in a wide range can be detected. Moreover, based on the accurately detected distance, whether or not there is a high possibility of a collision with the other vehicle is determined. Thus, whether or not there is a high possibility of a collision with the other vehicle can accurately be estimated.

According to the seventeenth aspect, a collision time at which a collision with the other vehicle is predicted to occur is estimated based on the obtained distance. Then, based on the estimated collision time, whether or not there is a high possibility of a collision with the other vehicle is determined. Therefore, whether or not there is a high possibility of a collision with the other vehicle can be estimated with an increased accuracy.

That is, for example, when the collision time is equal to or less than a predetermined threshold value, it is determined that there is a high possibility of a collision with the other vehicle. Thereby, whether or not there is a high possibility of a collision with the other vehicle can be estimated with an increased accuracy.

According to the eighteenth aspect, the collision time is estimated based on a change with time of the distance. Therefore, the collision time can be estimated with an increased accuracy.

According to the nineteenth aspect, a direction in which the other vehicle, to which the distance has been obtained, is present is obtained based on the own vehicle as a reference. Then, whether or not there is a high possibility of a collision with the other vehicle is determined based on the estimated collision time and the direction in which the other vehicle is present, which has been obtained by the direction detection part. Therefore, whether or not there is a high possibility of a collision with the other vehicle can be estimated with an increased accuracy.

That is, for example, when a period until the collision time is equal to or less than a predetermined threshold value and in addition an azimuth change rate, which indicates the degree of change, per unit time, of the direction in which the other vehicle is present, is equal to or less than a predetermined threshold value, it is determined that there is a high possibility of a collision with the other vehicle. Thereby, whether or not there is a high possibility of a collision with the other vehicle can be estimated with an increased accuracy According to the twentieth aspect, the direction in which the other vehicle is present is obtained based on a direction from which a radio wave signal of the other vehicle comes. Therefore, the direction in which the other vehicle is present can accurately be obtained.

According to the twenty-first aspect, a plurality of antennas for receiving radio wave signals are provided, and a direction from which the radio wave signals of the other vehicle come is obtained based on a phase difference between the radio wave signals received from the other vehicle by the plurality of antennas. The direction in which the other vehicle is present can be obtained with an increased accuracy.

According to the twenty-second aspect, it is determined that there is a high possibility of a collision with the other vehicle, when a time period until the collision time is equal to or less than a predetermined threshold value and in addition an azimuth change rate, which indicates the degree of change, per unit time, of the direction in which the other vehicle is present, is equal to or less than a predetermined threshold value. Whether or not there is a high possibility of a collision with the other vehicle can be determined with an increased accuracy.

That is, for example, in a situation where the other vehicle traveling in an opposite lane passes by the own vehicle, when the other vehicle approaches the own vehicle, a time period until the collision time becomes equal to or less than the predetermined threshold value, but the azimuth change rate does not become equal to or less than the predetermined threshold value (=the closer the other vehicle comes, the higher the azimuth change rate becomes). Therefore, it is not determined that there is a high possibility of a collision with the other vehicle. On the other hand, for example, in a situation where a collision at intersection may occur at a T-junction or the like, when the other vehicle approaches the own vehicle, a time period until the collision time becomes equal to or less than the predetermined threshold value and in addition the azimuth change rate also becomes equal to or less than the predetermined threshold value (=the closer the other vehicle comes, the smaller the value of the azimuth change rate becomes). Therefore, it is accurately determined that there is a high possibility of a collision with the other vehicle. In this manner, whether or not there is a high possibility of a collision with the other vehicle can be determined with an increased accuracy.

DESCRIPTION OF EMBODIMENTS

Hereinafter, embodiments of a distance detection device and a collision determination device according to the present invention will be described with reference to the drawings. The distance detection device according to the present invention is a distance detection device that is mounted in a vehicle and detects a distance to an other vehicle through information communicated with the other vehicle. The collision determination device according to the present invention is a collision determination device that: includes the distance detection device; is mounted in a vehicle; and determines a possibility of a collision with an other vehicle through information communicated with the other vehicle. The distance detection device according to the present invention is included in a collision determination device 100 according to the present invention. Therefore, in the following description, for the sake of convenience of the description, the collision determination device 100 will be described with reference to the drawings.

Figure 1:
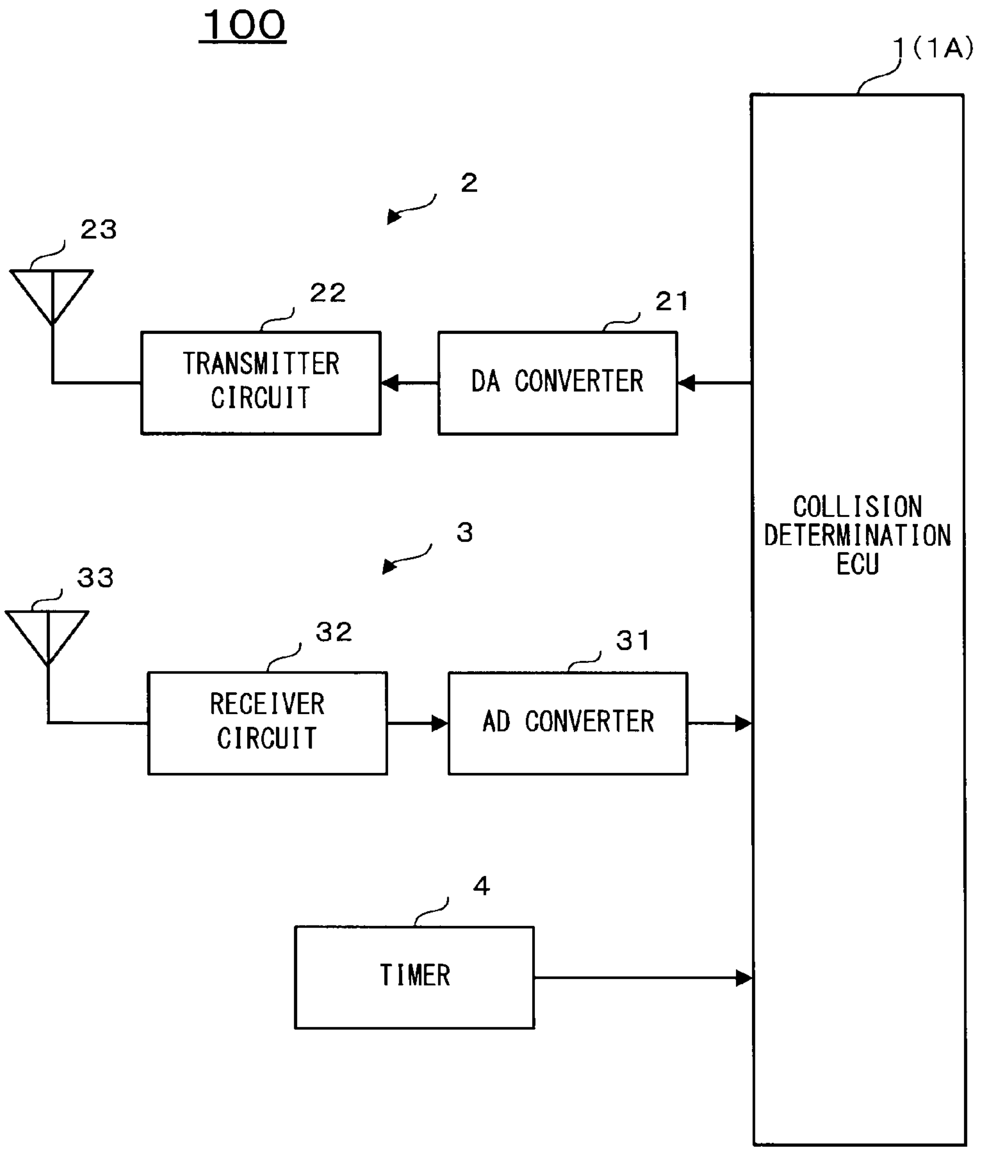
FIG. 1 is a block diagram showing an exemplary configuration of a collision determination device according to the present invention.

First, an example of the collision determination device 100 according to the present invention will be described with reference to FIG. 1. FIG. 1 is a block diagram showing an exemplary configuration of the collision determination device 100 according to the present invention. The collision determination device 100 (also corresponding to the distance detection device) includes a collision determination ECU 1 (or a collision determination ECU 1A), a transmission section 2, a reception section 3, and a timer 4.

The collision determination ECU (Electronic Control Unit) 1 (or the collision determination ECU 1A) is an ECU that controls a whole operation of the collision determination device 100 including the transmission section 2, the reception section 3, and the timer 4.

The transmission section 2 (corresponding to a part of a transmission part) transmits various kinds of information by broadcasting, in accordance with an instruction from the collision determination ECU 1 (or the collision determination ECU 1A), and the transmission section 2 includes a DA converter 21, a transmitter circuit 22, and a transmitting antenna 23.

The DA converter 21 is a converter that converts digital information provided from the collision determination ECU 1 (or the collision determination ECU 1A) (here, a transmission control section 102, see FIGS. 2 and 10), into an analog signal. The transmitter circuit 22 is a circuit that transmits, via the antenna 23, a transmission wave which is an electromagnetic wave signal of a predetermined frequency, in accordance with an instruction from the collision determination ECU 1 (or the collision determination ECU 1A) (here, a transmission control section 102, see FIGS. 2 and 10). The antenna 23 transmits, to around a vehicle, the transmission wave corresponding to a transmission wave signal generated by the transmitter circuit 22.

The reception section 3 (corresponding to a part of a reception part) receives a transmission wave transmitted from the other vehicle VCB, VCC (see FIG. 3), and includes an AD converter 31, a receiver circuit 32, and an antenna 33.

The antenna 33 receives a transmission wave transmitted from the other vehicle VCB, VCC (see FIG. 3), and the like. The receiver circuit 32 is a circuit that: receives a transmission wave from the other vehicle VCB, VCC (see FIG. 3), and the like, via the antenna 33; generates a reception wave signal corresponding to a reception wave; and outputs the reception wave signal to the collision determination ECU 1 (or the collision determination ECU 1A) (here, a reception control section 103, see FIGS. 2 and 10), via the AD converter 31. The AD converter 31 is a converter that: converts the reception wave signal generated by the receiver circuit 32, into digital information, at every sampling time which is predetermined; and outputs the digital information.

Figure 2:
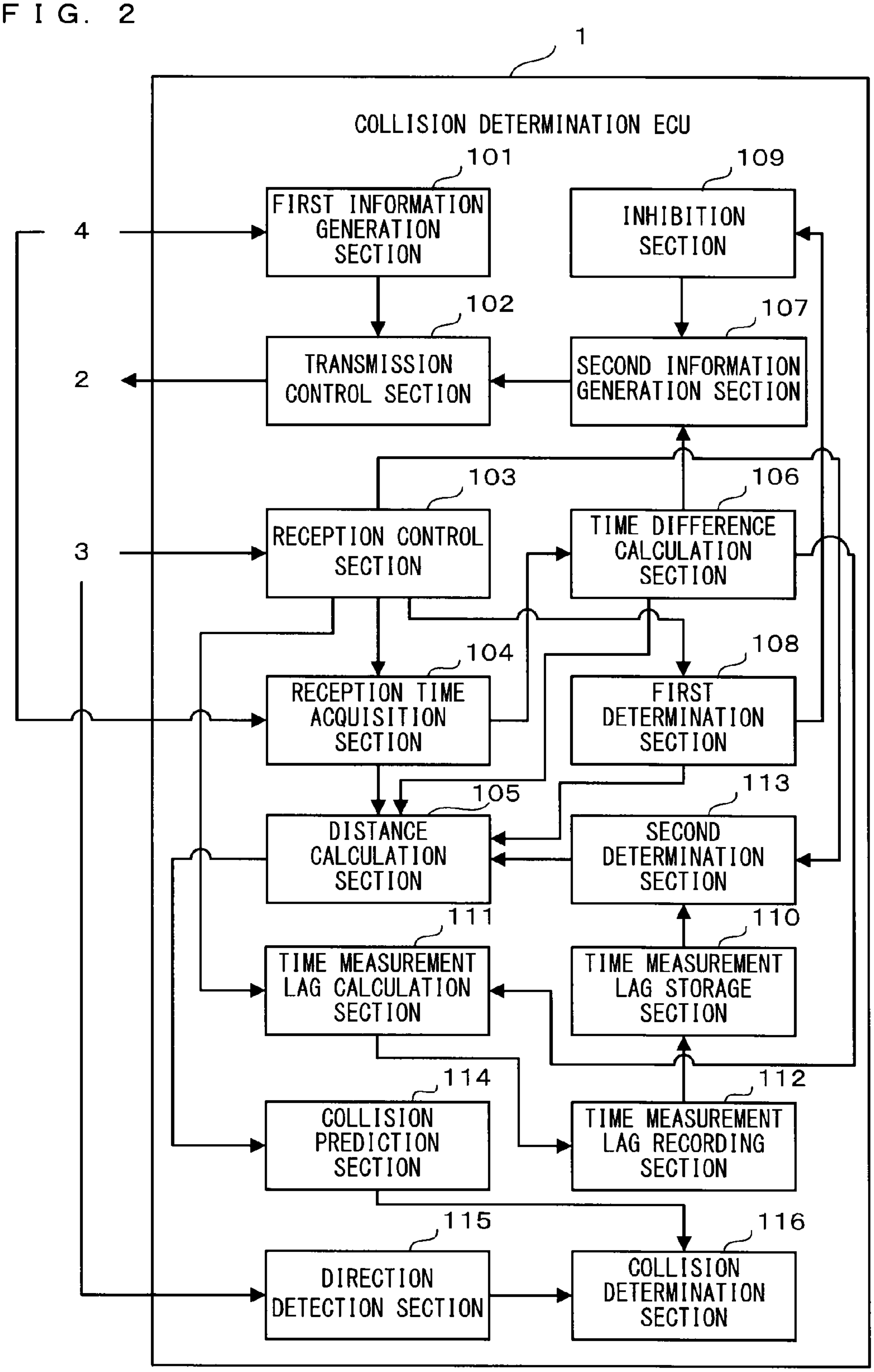
FIG. 2 is a block diagram showing an example of a functional configuration of a collision determination ECU according to a first embodiment.
Figure 10:
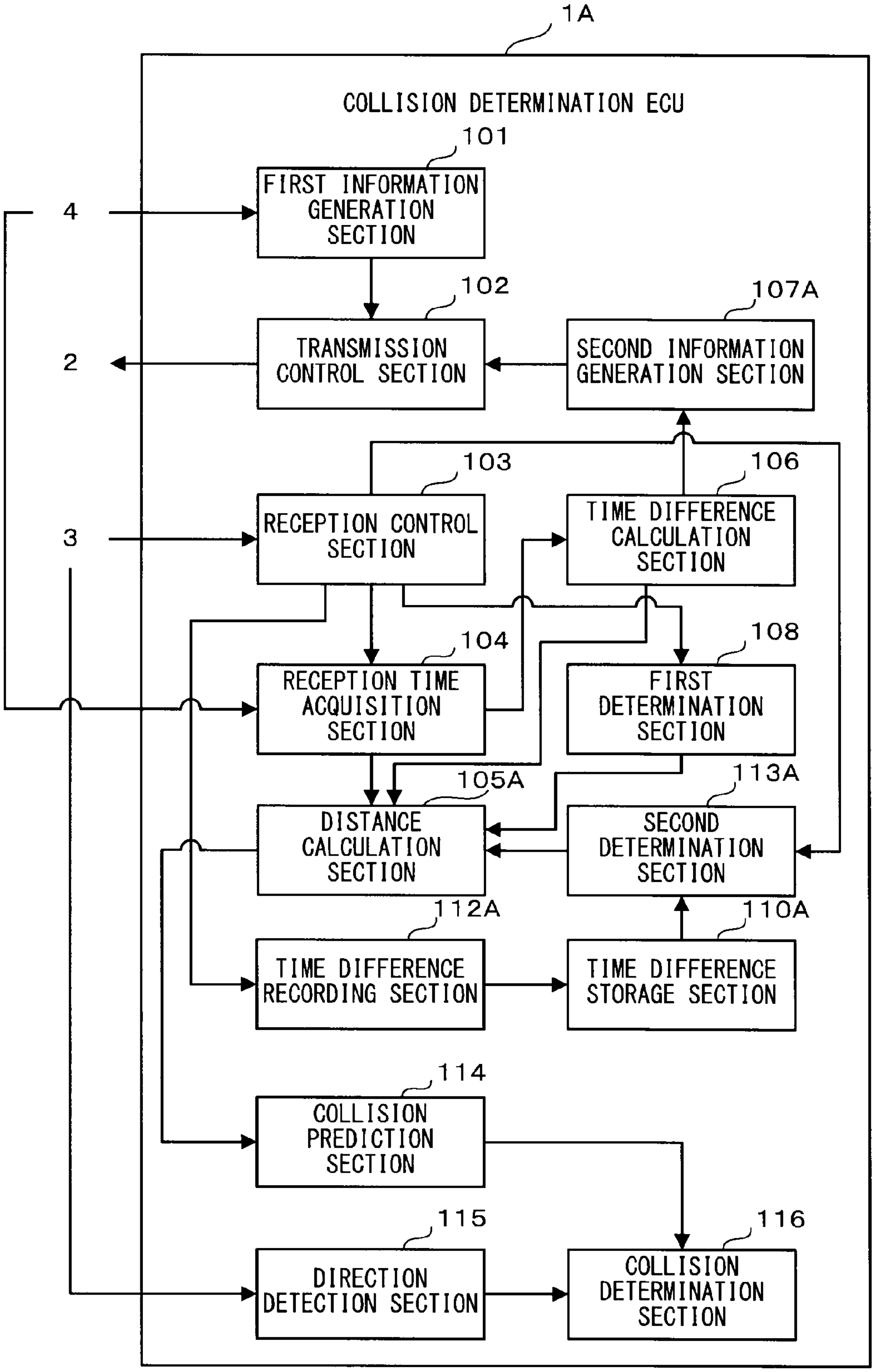
FIG. 10 is a block diagram showing an example of a functional configuration of a collision determination ECU according to a second embodiment.

The timer 4 (corresponding to a time measurement part) has a time measurement function, and outputs time information in response to a request from the collision determination ECU 1 (or the collision determination ECU 1A) (here, a first information generation section 101, a reception time acquisition section 104, and the like, see FIGS. 2 and 10). Here, the timer 4 repeatedly counts up (or counts down) within a predetermined time period (for example, 24 hours).

In the present embodiment, a case where the time measurement part is formed as the timer 4 is described, but the time measurement part may be formed as a clock. In such a case, the time measurement part outputs clock time information to the collision determination ECU 1 (or the collision determination ECU 1A) (here, the first information generation section 101, the reception time acquisition section 104, and the like; see FIGS. 2 and 10).

Moreover, in the present embodiment, the case where the time measurement part is formed as the timer 4 is described, but the time measurement part may be configured as a functional section in the collision determination ECU 1 (or the collision determination ECU 1A). In such a case, a configuration is simplified.

First Embodiment

FIG. 2 is a block diagram showing an example of a functional configuration of the collision determination ECU 1 according to the first embodiment. The collision determination ECU 1 functionally includes a first information generation section 101, a transmission control section 102, a reception control section 103, a reception time acquisition section 104, a distance calculation section 105, a time difference calculation section 106, a second information generation section 107, a first determination section 108, an inhibition section 109, a time measurement lag storage section 110, a time measurement lag calculation section 111, a time measurement lag recording section 112, a second determination section 113, a collision prediction section 114, a direction detection section 115, and a collision determination section 116.

The collision determination ECU 1 causes a micro computer, which is arranged at an appropriate position in the collision determination ECU 1, to execute a control program prestored in an ROM (Read Only Memory) or the like which is arranged at an appropriate position in the collision determination ECU 1, and thereby causes the micro computer to function as functional sections such as the first information generation section 101, the transmission control section 102, the reception control section 103, the reception time acquisition section 104, the distance calculation section 105, the time difference calculation section 106, the second information generation section 107, the first determination section 108, the inhibition section 109, the time measurement lag storage section 110, the time measurement lag calculation section 111, the time measurement lag recording section 112, the second determination section 113, the collision prediction section 114, the direction detection section 115, and the collision determination section 116.

The distance detection device according to the first embodiment includes: the transmission section 2, the reception section 3, and the timer 4 shown in FIG. 1; and, among the functional sections of the collision determination ECU 1, the first information generation section 101, the transmission control section 102, the reception control section 103, the reception time acquisition section 104, the distance calculation section 105, the time difference calculation section 106, the second information generation section 107, the first determination section 108, the inhibition section 109, the time measurement lag storage section 110, the time measurement lag calculation section 111, the time measurement lag recording section 112, and the second determination section 113.

Figure 3:
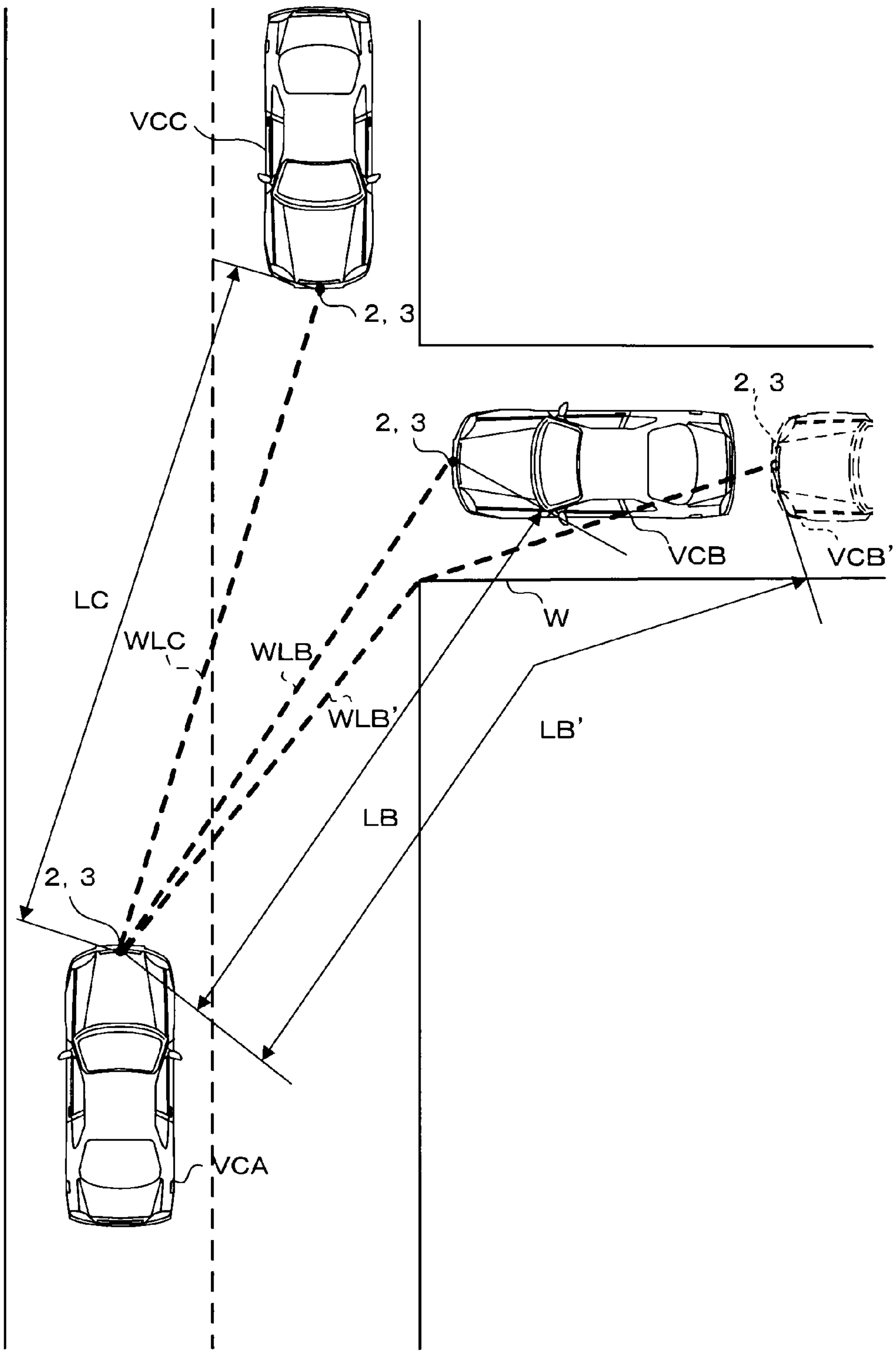
FIG. 3 is a plan view showing an example of distances LB, LC detected through car-to-car communication with other vehicles VCB, VCC.

The first information generation section 101 (corresponding to a first information generation part) is a functional section that: acquires time information from the timer 4 every predetermined time period PA (for example, 50 msec) which is predetermined; associates own vehicle time information TAn (n: natural number) representing an own vehicle time, which is the acquired time information, with own vehicle identification information IDA which is predetermined identification information of the own vehicle; and generates first output information FA1*n* which is information to be transmitted toward the other vehicle VCB, VCC (corresponding to an other vehicle; see FIG. 3).

The transmission control section 102 (corresponding to a part of the transmission part) is a functional section which, each time output information is generated by the first information generation section 101, transmits the generated first output information FA1*n* by broadcasting, via the transmission section 2. When second output information FA2*m* (m: natural number) is generated by the second information generation section 107, the transmission control section 102 transmits, by broadcasting, the generated second output information FA2*m* together with the first output information FA1*n* generated by the first information generation section 101, via the transmission section 2.

The reception control section 103 (corresponding to a part of the reception part) is a functional section that receives, via the reception section 3, own vehicle time information TBk (or own vehicle time information TCi) (k: natural number; i: natural number) representing an own vehicle time and own vehicle identification information IDB (or own vehicle identification information IDC), which are included in first output information FA1*n* transmitted by broadcasting from the other vehicle VCB (or the other vehicle VCC) (corresponding to the other vehicle; see FIG. 3), as other vehicle time information TBk (or other vehicle time information TCi), which represents an other vehicle time of the other vehicle VCB (or the other vehicle VCC), and other vehicle identification information IDB (or other vehicle identification information IDC) which is identification information of the other vehicle VCB (or the other vehicle VCC), respectively. The reception control section 103 receives, via the reception section 3, second output information transmitted by broadcasting from the other vehicle VCB (or the other vehicle VCC) (see FIG. 3).

FIG. 3 is a plan view showing an example of distances LB, LC detected through car-to-car communication with the other vehicles VCB, VCC. As shown in the drawing, the own vehicle VCA is traveling upward in the drawing on a two-lane road. The other vehicle VCB is entering the road on which the own vehicle VCA is traveling, from a T-junction located in the direction toward which the own vehicle VCA is traveling. The other vehicle VCC is traveling downward in the drawing in the opposite lane of the road on which the own vehicle VCA is traveling. Each of the own vehicle VCA and the other vehicles VCB and VCC is equipped with the collision determination device 100.

First, via the transmission section 2 which is provided at a front portion of the own vehicle VCA, the transmission control section 102 transmits first output information FA1*n* by broadcasting. Then, the reception section 3 which is provided at a front portion of the other vehicle VCB (or the other vehicle VCC) receives the first output information FA1*n*. Next, via the transmission section 2 which is provided at the front portion of the other vehicle VCB (or the other vehicle VCC), the transmission control section 102 transmits, by broadcasting, first output information FB1*k* and second output information FB2*k* (or first output information FC1*i* and second output information FC2*i*). Then, via the reception section 3 which is provided at the front portion of the own vehicle VCA, the reception control section 103 receives the first output information FB1*k* and the second output information FB2*k* (or the first output information FC1*i* and the second output information FC2*i*); and the distance calculation section 105 calculates the distance LB (or a distance LC).

In this manner, the own vehicle VCA transmits to and receives from the other vehicle VCB (or the other vehicle VCC), the first output information FA1*n*, and the first output information FB1*k* and the second output information FB2*k* (or the first output information FC1*i* and the second output information FC2*i*) by broadcasting via the transmission section 2 and the reception section 3 provided in each of the vehicles; and thereby the own vehicle VCA calculates the distance LB (or the distance LC). That is, the distance LB (or the distance LC) obtained by the distance calculation section 105 of the own vehicle VCA is the length of a communication path WLB (or a communication path WLC) between the transmission section 2 and the reception section 3 which are mounted in the own vehicle VCA, and the transmission section 2 and the reception section 3 which are mounted in the other vehicle VCB (or the other vehicle VCC).

Accordingly, in a case where the communication path WLB between the own vehicle VCA and the other vehicle VCB' is interrupted by a wall W or the like, a radio wave transmitted from the own vehicle VCA reaches the other vehicle VCB' while being diffracted. Therefore, a distance LB' to be obtained by the distance calculation section 105 of the own vehicle VCA is not a linear distance between the transmission section 2 and the reception section 3 of the own vehicle VCA, and the transmission section 2 and the reception section 3 of the other vehicle VCB', but the length of a diffracted communication path WLB'.

Returning to FIG. 2, the functional configuration of the collision determination ECU 1 will be described. The reception time acquisition section 104 (corresponding to a reception time acquisition part) is a functional section that acquires, as reception time information representing a reception time, time information from the timer 4, when the reception control section 103 receives first output information FB1*h* (h: natural number) (or first output information FC1*j*) (j: natural number) from the other vehicle VCB (or the other vehicle VCC) (see FIG. 3).

The distance calculation section 105 (corresponding to a distance calculation part) is a functional section that obtains the distance LB, LC (see FIG. 3) to the other vehicle VCB, VCC, based on: the other vehicle time information included in the first output information FB1*h*, FC1*j* received by the reception control section 103; and the reception time information acquired by the reception time acquisition section 104.

When the first determination section 108 determines that the other vehicle identification information included in the second output information FB2*k* (or the second output information FC2*i*) received by the reception control section 103 is coincident with the own vehicle identification information IDA, the distance calculation section 105 obtains the distance LB (or the distance LC) to the other vehicle VCB (or the other vehicle VCC), based on second time difference information representing a second time difference ΔT2, which is first time difference information representing a first time difference included in the second output information FB2*k* (or the second output information FC2*i*) received by the reception control section 103.

To be specific, when the reception control section 103 receives the second output information FB2*k* (or the second output information FC2*i*), the distance calculation section 105 obtains an average value of a first time difference ΔT1, which is obtained by the time difference calculation section 106, and a second time difference ΔT2, which is included in the second output information FB2*k* (or the second output information FC2*i*) received by the reception control section 103. The distance calculation section 105 multiplies the obtained average value by the speed of light C, to thereby obtain the distance LB, LC (see FIG. 3) to the other vehicle VCB, VCC. That is, the distance calculation section 105 obtains the distance L (LB, LC), based on the following equation (1). The reason why the distance LB, LC can be obtained by the equation (1) will be described after a description of the function of the time measurement lag calculation section 111 is given.

$$L=(\Delta T1+\Delta T2)/2\times C \tag{1}$$

When the second determination section 113 determines that the other vehicle identification information which is included in the received first output information FB1*h* (or the first output information FC1*j*) is coincident with any of the other vehicle identification information IDB, IDC which is stored in the time measurement lag storage section 110, the distance calculation section 105: obtains the sum of the first time difference ΔT1 obtained by the time difference calculation section 106 and a time measurement lag ΔT0 read from the time measurement lag storage section 110; and multiplies the obtained sum by the speed of light C, to thereby obtain the distance LB, LC (see FIG. 3) to the other vehicle VCB, VCC. That is, the distance calculation section 105 obtains the distance L (LB, LC), based on the following equation (2). The reason why the distance LB, LC can be obtained by the equation (2) will be described after the description of the function of the time measurement lag calculation section 111 is given.

$$L=(\Delta T0+\Delta T1)\times C \tag{2}$$

The time difference calculation section 106 (corresponding to a time difference calculation part) is a functional section that, when the reception control section 103 receives the first output information FB1*h* (or the first output information FC1*j*) from the other vehicle VCB, VCC (see FIG. 3), obtains, as the first time difference ΔT1, a time difference resulting from an other vehicle time TBh (or other vehicle time TCj), which is included in the received first output information FB1*h* (or the first output information FC1*j*), being subtracted from the reception time TAn acquired by the reception time acquisition section 104. That is, the time difference calculation section 106 obtains the time difference, as the first time difference ΔT1, based on the following equation (3) or the following equation (4).

$$\Delta T1=TAn-TBh \tag{3}$$

$$\Delta T1=TAn-TCj \tag{4}$$

The second information generation section 107 (corresponding to a second information generation part) is a functional section that, when the reception control section 103 receives the first output information FB1*h* (or the first output information FC1*j*), associates first time difference information representing the first time difference ΔT1 obtained by the time difference calculation section 106, with the other vehicle identification information IDB (or the other vehicle identification information IDC) received by the reception control section 103, to thereby generate second output information FA2*m* (m: natural number). However, when the inhibition section 109 inhibits generation of the second output information FA2*m*, the second information generation section 107 does not generate the second output information FA2*m* even if the reception control section 103 receives the first output information FB1*h* (or the first output information FC1*j*).

The first determination section 108 (corresponding to a first determination part) is a functional section that, when the reception control section 103 receives the second output information FB2*k* (or the second output information FC2*i*) from the other vehicle VCB, VCC, determines whether or not the other vehicle identification information included in the received second output information FB2*k* (or the second output information FC2*i*) is coincident with the own vehicle identification information IDA.

That is, when the other vehicle VCB, VCC receives the first output information FA1*n* from the own vehicle VCA, the second information generation section 107 of the other vehicle VCB, VCC generates the second output information FB2*k* (or the second output information FC2*i*) in which the other vehicle identification information IDA received by the reception control section 103 is associated with the time difference information. Then, the transmission control section 102 transmits the generated second output information FB2*k* (or second output information FC2*i*). When the second output information FB2*k* (or second output information FC2*i*) transmitted from the other vehicle VCB, VCC is received by the reception control section 103 of the own vehicle VCA, the other vehicle identification information included in the received second output information FB2*k* (or second output information FC2*i*) is coincident with the own vehicle identification information IDA.

In other words, when the reception control section 103 receives the second output information FB2*k* (or the second output information FC2*i*) from the other vehicle VCB, VCC, the first determination section 108 determines whether or not this second output information FB2*k* (or second output information FC2*i*) has been generated as a result of the first output information FA1*n* transmitted from the own vehicle VCA being received by the other vehicle VCB, VCC.

When the first determination section 108 determines that there is a coincidence, the first time difference ΔT1 (which is handled as the second time difference ΔT2 by the distance calculation section 105, the time measurement lag calculation section 111, and the like) included in the second output information FB2*k* (or the second output information FC2*i*) is represented by the following equation (5) or (6) (see the above-mentioned equations (3) and (4)).

$$\Delta T1(\Delta T2)=TBk-TAm \quad (5)$$

$$\Delta T1(\Delta T2)=TCi-TAm \quad (6)$$

The inhibition section 109 (corresponding to an inhibition part) is a functional section that, when the first determination section 108 determines that the other vehicle identification information included in the second output information FB2*k* (or the second output information FC2*i*) received by the reception control section 103 is coincident with the own vehicle identification information IDA, determines whether or not the following "inhibition determination criterion" is satisfied, and inhibits the second information generation section 107 from generating the second output information FA2*m* when the inhibition section 109 determines that the "inhibition determination criterion" is satisfied.

The "inhibition determination criterion" is that the number of times DN the second output information FA2*m*, in which the own vehicle identification information IDB (or the own vehicle identification information IDC) included in the first output information FB1*k* (or the first output information FC1*i*) which is received simultaneously with the second output information FB2*k* (or the second output information FC2*i*) by the reception control section 103 is included as the aforesaid other vehicle identification information, has been generated by the second information generation section 107 and transmitted by the transmission control section 102, is equal to or greater than a second predetermined number of times NSH which is not less than 1. In the first embodiment, a case where the second predetermined number of times NSH is 1 will be described.

That is, when it is determined that the other vehicle identification information included in the received second output information FB2*k* (or second output information FC2*i*) is coincident with the own vehicle identification information IDA, time measurement lag information representing a time measurement lag ΔT0 corresponding to the own vehicle identification information IDB (or the own vehicle identification information IDC) which is included in the first output information FB1*k* (or the first output information FC1*i*) received simultaneously with the second output information FB2*k* (or the second output information FC2*i*) is recorded in the time measurement lag storage section 110. Based on this time measurement lag information representing the time measurement lag ΔT0, the distance LB (or the distance LC) to the other vehicle VCB (or the other vehicle VCC) corresponding to the own vehicle identification information IDB (or the own vehicle identification information IDC) is obtained. Thus, it is not necessary that the own vehicle VCA receives the second output information from the other vehicle VCB (or the other vehicle VCC), in order to obtain the distance LB (or the distance LC) to the other vehicle VCB (or the other vehicle VCC).

When the number of times DN the second output information FA2*m*, in which the own vehicle identification information IDB (or the own vehicle identification information IDC) included in the first output information FB1*k* (or the first output information FC1*i*) received simultaneously with the received second output information FB2*k* (or the second output information FC2*i*) is included as the aforesaid other vehicle identification information, is transmitted is equal to or greater than the predetermined number of times NSH which is not less than 1; if the predetermined number of times NSH is set to an appropriate number of times (for example, once), it is estimated that the other vehicle VCB (or the other vehicle VCC) corresponding to the other vehicle identification information IDB (or the other vehicle identification information IDC) has already received the second output information FA2*m* transmitted from the own vehicle VCA. In this case, therefore, it is estimated that: in the other vehicle VCB (or the other vehicle VCC) corresponding to the other vehicle identification information IDB (or the other vehicle identification information IDC), time measurement lag information representing a time measurement lag ΔT0 corresponding to the own vehicle identification information IDA is recorded in the time measurement lag storage section 110; and the distance LB (or the distance LC) to the own vehicle VCA is obtained based on this time measurement lag information representing the time measurement lag ΔT0. Accordingly, it is not necessary to transmit the second output information FA2*m* to the other vehicle VCB (or the other vehicle VCC) corresponding to the other vehicle identification information IDB (or the other vehicle identification information IDC).

Moreover, when it is determined that the number of times DN the second output information FA2*m* is transmitted is equal to or greater than the predetermined number of times NSH, the second output information FA2*m* is not generated, and therefore only the first output information FA1*n* is transmitted. As a result, the amount of information transmitted and received can be reduced, and thus the frequency of transmission and reception can be increased. This enables the distance LB (or the distance LC) to the other vehicle VCB (or the other vehicle VCC) to be detected with an increased accuracy.

In the first embodiment, the description is given of a case where the inhibition section 109 inhibits generation of the second output information FA2*m*, when the first determination section 108 determines that there is a coincidence and in addition it is determined that the "inhibition determination criterion" is satisfied. However, the inhibition section 109 may inhibit generation of the second output information FA2*m* by using another criterion.

For example, the inhibition section 109 may inhibit generation of the second output information FA2*m*, when the first determination section 108 determines that there is a coincidence and in addition the number of times the first determination section 108 determines that there is a coincidence is equal to or greater than a first predetermined number of times which is not less than 2. In this case, when the number of times it is determined that the other vehicle identification information included in the received second output information FB2*k* (or second output information FC2*i*) is coincident with the own vehicle identification information IDA is equal to or greater than the first predetermined number of times which is not less than 2; if the first predetermined number of times is set to an appropriate number of times (for example, twice), it is estimated that the other vehicle VCB (or the other vehicle VCC) corresponding to the other vehicle identification information IDB (or the other vehicle identification information IDC) has already received the second output information FA2*m* transmitted from the own vehicle VCA. In such a case, the same effects as in the first embodiment can be obtained.

Furthermore, for example, when the first determination section 108 determines that the other vehicle identification information included in the second output information FB2*k* (or the second output information FC2*i*) received by the reception control section 103 is coincident with the own vehicle identification information IDA, third output information, which indicates that the second output information FB2*k* (or the second output information FC2*i*) from the other vehicle VCB (or the other vehicle VCC) has been received, may be transmitted, via the transmission control section 102, to the other vehicle VCB (or the other vehicle VCC) corresponding to the own vehicle identification information IDB (or the own vehicle identification information IDC) included in the first output information FB1*k* (or the first output information FC1*i*) which is received simultaneously with the second output information FB2*k* (or the second output information FC2*i*). Then, when the third output information is received from the other vehicle VCB (or the other vehicle VCC), generation of the second output information FA2*m* for the other vehicle VCB (or the other vehicle VCC) may be inhibited.

In this case, generation of the second output information FA2*m* is inhibited on or after the second output information FA2*m* is surely received by the other vehicle VCB (or the other vehicle VCC). Therefore, the distance LB (or the distance LC) can be surely detected.

Figure 4:
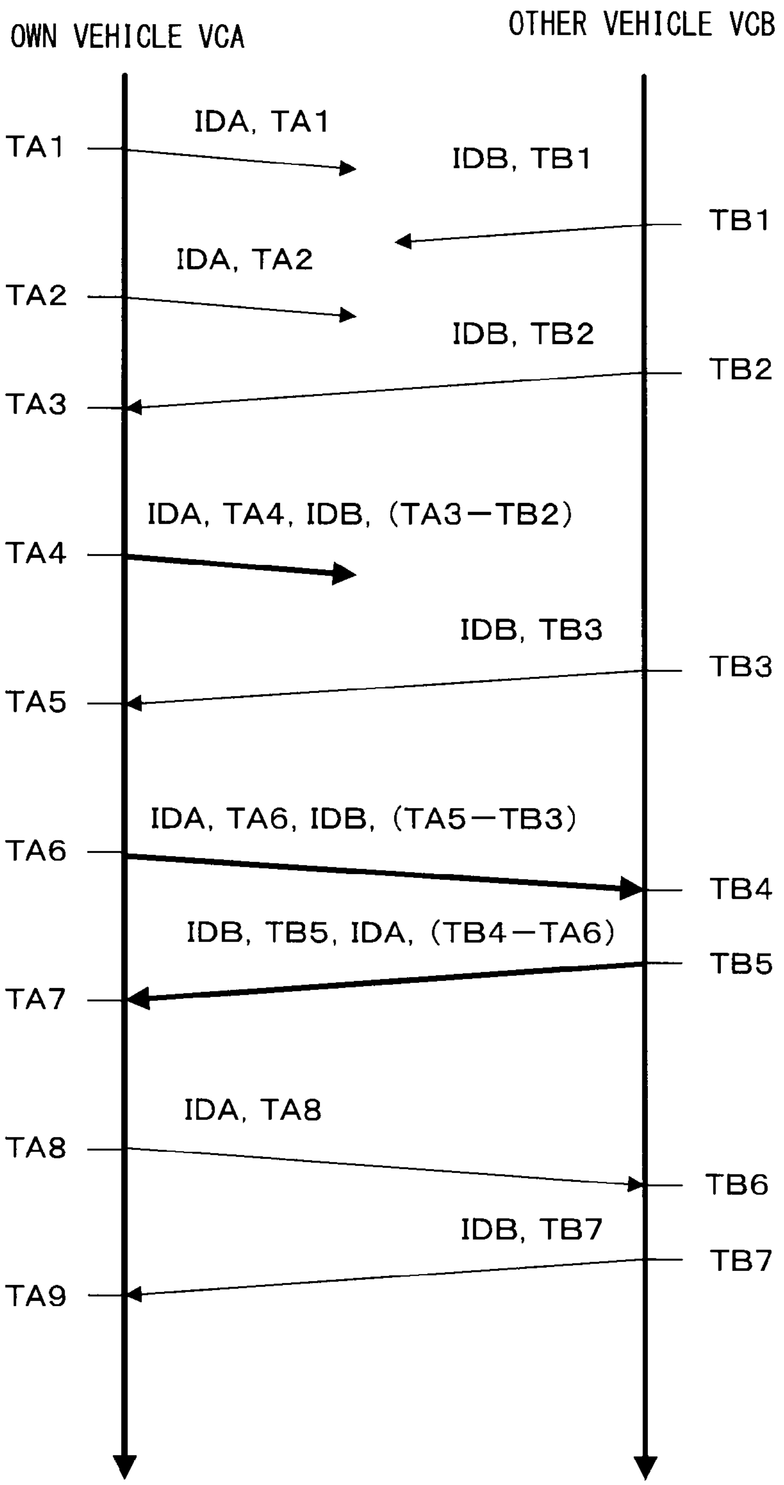
FIG. 4 is a timing chart showing an example of information transmitted and received between an own vehicle VCA and the other vehicle VCB.
Figure 5:
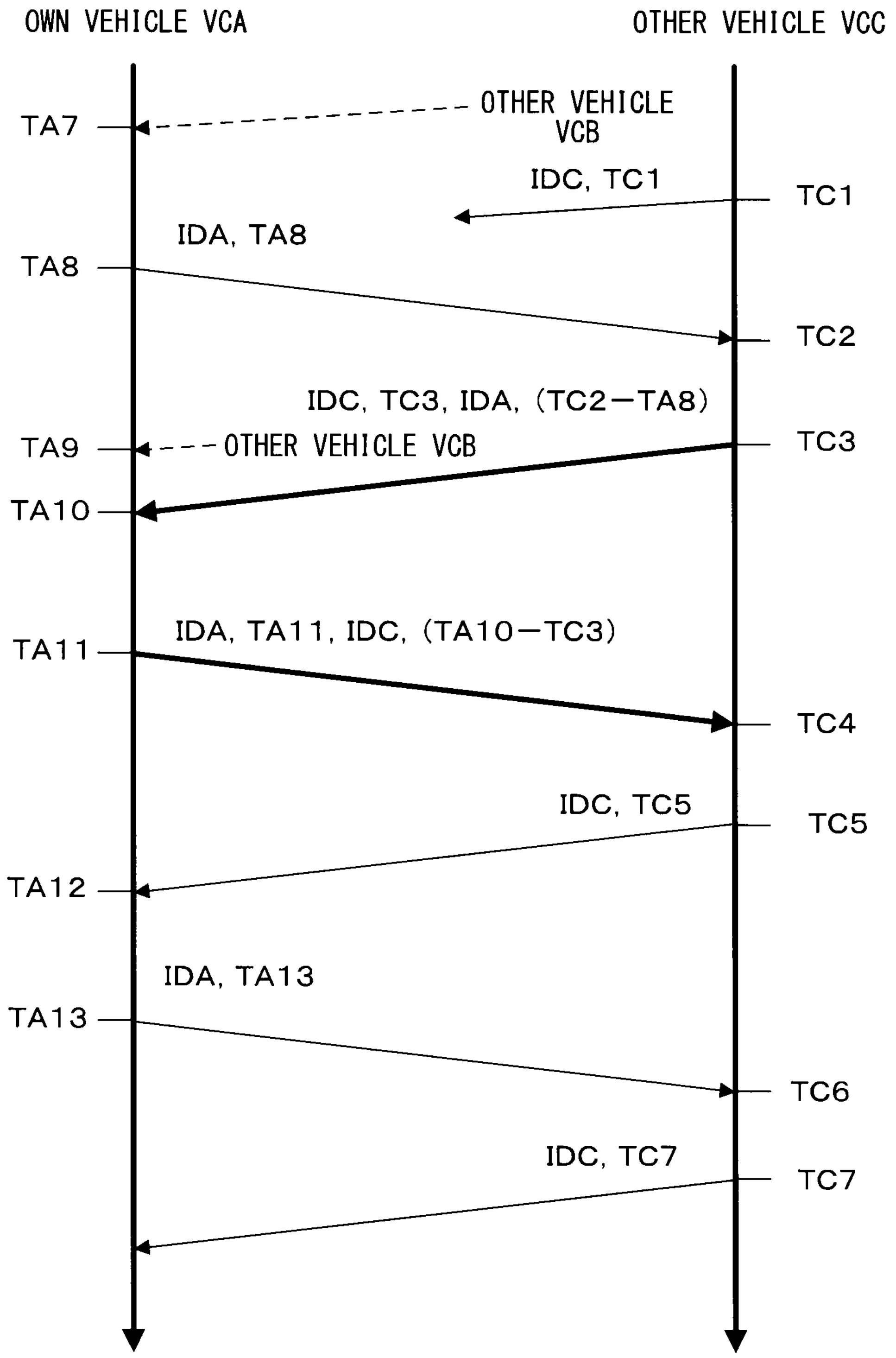
FIG. 5 is a timing chart showing an example of information transmitted and received between the own vehicle VCA and the other vehicle VCC.

FIGS. 4 and 5 are timing charts showing examples of information transmitted and received by the collision determination ECU 1. FIG. 4 is a timing chart showing an example of information transmitted and received between the own vehicle VCA and the other vehicle VCB. FIG. 5 is a timing chart showing an example of information transmitted and received between the own vehicle VCA and the other vehicle VCC. In FIGS. 4 and 5, the vertical axis represents time, and an arrow pointing diagonally down and right (or diagonally down and left) represents a direction of transmission of transmitted information. A bold arrow pointing diagonally down and right (or diagonally down and left) represents a direction of transmission of transmitted information including second output information. Contents of the transmitted information are shown above each arrow. Moreover, a code (for example, TA1, TB6) near the originating point of each arrow represents a count value of the time 4.

Firstly, with reference to FIG. 4, an example of information transmitted and received between the own vehicle VCA and the other vehicle VCB will be described. At a time point TA1, first output information (IDA, TA1) is transmitted from the own vehicle VCA. Then, at a time point TB1, first output information (IDB, TB1) is transmitted from the other vehicle VCB. Subsequently, at a time point TA2, first output information (IDA, TA2) is transmitted from the own vehicle VCA. Then, at a time point TB2, first output information (IDB, TB2) is transmitted from the other vehicle VCB, and, at a time point TA3, received by the own vehicle VCA. In the own vehicle VCA, since the first output information (IDB, TB2) from the other vehicle VCB is received at the time point TA3, second output information (IDB, (TA3-TB2)) is generated by the second information generation section 107. At a time point TA4, first output information (IDA, TA4) and the second output information (IDB, (TA3-TB2)) are transmitted from the own vehicle VCA. In the other vehicle VCB, on the other hand, since the first output information from the own vehicle VCA is not received even at a time point TB3, first output information (IDB, TB3) is continuously transmitted from the other vehicle VCB. At a time point TA5, the first output information (IDB, TB3) is received by the own vehicle VCA.

Then, in the own vehicle VCA, since the first output information (IDB, TB3) from the other vehicle VCB is received at the time point TA5, first output information (IDA, TA6) and second output information (IDB, (TA5-TB3)) are transmitted from the own vehicle VCA at a time point TA6. At a time point TB4, the first output information (IDA, TA6) and the second output information (IDB, (TA5-TB3)) are received by the other vehicle VCB. In the other vehicle VCB, since the second output information (IDB, (TA5-TB3)) from the own vehicle VCA is received at the time point TB4; the distance calculation section 105 obtains a distance LB, the time measurement lag calculation section 111 calculates a time measurement lag ΔT0, and the time measurement lag recording section 112 writes the time measurement lag ΔT0 into the time measurement lag storage section 110. In the other vehicle VCB, since the first output information (IDA, TA6) from the own vehicle VCA is received at the time point TB4, second output information (IDA, (TB4-TA6)) is generated by the second information generation section 107. At a time point TB5, first output information (IDB, TB5) and the second output information (IDA, (TB4-TA6)) are transmitted from the other vehicle VCB. At a time point TA7, the first output information (IDB, TB5) and the second output information (IDA, (TB4-TA6)) are received by the own vehicle VCA. Furthermore, in the other vehicle VCB, the second output information (IDB, (TA5-TB3)) from the own vehicle VCA is received at the time point TB4, and the second output information (IDA, (TB4-TA6)) is transmitted at the time point TB5. Therefore, on or after a time point TB7, the inhibition section 109 inhibits generation of second output information.

Next, in the own vehicle VCA, since the second output information (IDA, (TB4-TA6)) from the other vehicle VCB is received at a time point TA7; the distance calculation section 105 obtains a distance LB, the time measurement lag calculation section 111 calculates a time measurement lag ΔT0, and the time measurement lag recording section 112 writes the time measurement lag ΔT0 into the time measurement lag storage section 110. In the own vehicle VCA, the second output information (IDA, (TB4-TA6)) from the other vehicle VCB is received at the time point TA7, and the second output information (IDB, (TA5-TB3)) is transmitted at the time point TA6. Therefore, on or after a time point TA8, the inhibition section 109 inhibits generation of second output information.

First output information (IDA, TA8) is transmitted from the own vehicle VCA at the time point TA8, and received by the other vehicle VCB at a time point TB6. In the other vehicle VCB, since the first output information (IDA, TA8) is received at the time point TB6, the distance calculation section 105 reads, from the time measurement lag storage section 110, the time measurement lag ΔT0 that corresponds to the identification information IDA included in the first output information, and thus obtains a distance LB. Then, in the other vehicle VCB, first output information (IDB, TB7) is transmitted at the time point TB7. This information is received by the own vehicle VCA at a time point TA9. In the own vehicle VCA, since the first output information (IDB, TB7) is received at the time point TA9, the distance calculation section 105 reads, from the time measurement lag storage section 110, the time measurement lag ΔT0 that corresponds to the identification information IDB included in the first output information, and thus obtains a distance LB.

Next, with reference to FIG. 5, an example of information transmitted and received between the own vehicle VCA and the other vehicle VCC will be described. At a time point TC1, first output information (IDC, TC1) is transmitted from the other vehicle VCC. Then, at the time point TA8, the first output information (IDA, TA8) is transmitted from the own vehicle VCA, and, at a time point TC2, received by the other vehicle VCC. In the other vehicle VCC, since the first output information (IDA, TA8) from the own vehicle VCA is received at the time point TC2, second output information (IDA, (TC2-TA8)) is generated by the second information generation section 107. At a time point TC3, first output information (IDC, TC3) and the second output information (IDA, (TC2-TA8)) are transmitted from the other vehicle VCC, and, at a time point TA10, received by the own vehicle VCA.

Then, in the own vehicle VCA, since the second output information (IDA, (TC2-TA8)) from the other vehicle VCC is received at the time point TA10; the distance calculation section 105 obtains a distance LC; the time measurement lag calculation section 111 calculates a time measurement lag ΔT0; and the time measurement lag recording section 112 writes the time measurement lag ΔT0 into the time measurement lag storage section 110. Since, in the own vehicle VCA, the first output information (IDC, TC3) from the other vehicle VCC is received at the time point TA 10, first output information (IDA, TA11) and second output information (IDC, (TA10-TC3)) are transmitted from the own vehicle VCA at a time point TA11. At a time point TC4, the first output information (IDA, TA11) and the second output information (IDC, (TA10-TC3)) are received by the other vehicle VCC. In the own vehicle VCA, the second output information (IDA, (TC2-TA8)) from the other vehicle VCC is received at the time point TA10, and the second output information (IDC, (TA10-TC3)) is transmitted at the time point TA11. Therefore, on or after a time point TA13, the inhibition section 109 inhibits generation of second output information.

In the other vehicle VCC, since the second output information (IDC, (TA10-TC3)) from the own vehicle VCA is received at the time point TC4; the distance calculation section 105 obtains a distance LC; the time measurement lag calculation section 111 calculates a time measurement lag ΔT0; and the time measurement lag recording section 112 writes the time measurement lag ΔT0 into the time measurement lag storage section 110. In the other vehicle VCC, the second output information (IDC, (TA10-TC3)) from the own vehicle VCA is received at the time point TC4, and the second output information (IDA, (TC2-TA8)) is transmitted at the time point TC3. Therefore, on or after a time point TC5, the inhibition section 109 inhibits generation of second output information.

Then, in the other vehicle VCC, first output information (IDC, TC5) is transmitted. This information is received by the own vehicle VCA at a time point TA12. In the own vehicle VCA, since the first output information (IDC, TC5) is received at the time point TA12; the distance calculation section 105 reads, from the time measurement lag storage section 110, the time measurement lag ΔT0 that corresponds to the identification information IDC included in the first output information, and thus obtains a distance LC. At the time point TA13, first output information (IDA, TA13) is transmitted from the own vehicle VCA, and, at a time point TC6, received by the other vehicle VCC. In the other vehicle VCC, since the first output information (IDA, TA13) is received at the time point TC6; the distance calculation section 105 reads, from the time measurement lag storage section 110, the time measurement lag ΔT0 that corresponds to the identification information IDA included in the first output information, and thus obtains a distance LC. Then, in the other vehicle VCC, first output information (IDC, TC7) is transmitted at a time point TC7.

Returning to FIG. 2, the functional configuration of the collision determination ECU 1 will be described. The time measurement lag storage section 110 (corresponding to a time measurement lag storage part) is a functional section that stores therein time measurement lag information representing a time measurement lag ΔT0, which is a difference in measurement time between the timer 4 mounted in the other vehicle VCB, VCC and the timer 4 mounted in the own vehicle VCA, so as to associate the time measurement lag information representing the time measurement lag ΔT0 with the other vehicle identification information IDB, IDC of the other vehicle VCB, VCC. The time measurement lag information representing the time measurement lag ΔT0, and the other vehicle identification information IDB, IDC, which are stored in the time measurement lag storage section 110, are written by the time measurement lag recording section 112. The time measurement lag information representing the time measurement lag ΔT0, and the other vehicle identification information IDB, IDC, which are stored in the time measurement lag storage section 110, are read by the distance calculation section 105, the second determination section 113, and the like.

The time measurement lag calculation section 111 (corresponding to a time measurement lag calculation part) is a functional section that, when the first determination section 108 determines that there is a coincidence, obtains, as a time measurement lag ΔT0, one half of a difference resulting from the first time difference ΔT1 obtained by the time difference calculation section 106 being subtracted from the second time difference ΔT2 included in the second output information FB2$k$ (or the second output information FC2$i$) received by the reception control section 103. That is, the time measurement lag calculation section 111 obtains the time measurement lag ΔT0, based on the following equation (7).

$$\Delta T0=(\Delta T2-\Delta T1)/2 \quad (7)$$

By substituting the equations (3) and (5) into the above-mentioned equation (7), the following equation (8) is obtained.

$$\Delta T0=((TBk-TAm)-(TAn-TBh))/2 \quad (8)$$

In the same manner, by substituting the equations (4) and (6) into the above-mentioned equation (7), the following equation (9) is obtained.

$$\Delta T0=((TCi-TAm)-(TAn-TCj))/2 \quad (9)$$

Here, the following equations (10) to (13) are established, when: a time period required for a radio wave transmitted from the own vehicle VCA to reach the other vehicle VCB (or the other vehicle VCC) is defined as TAB, TAC; a time period required for a radio wave transmitted from the other vehicle VCB (or the other vehicle VCC) to reach the own vehicle VCA is defined as TBA, TCA; and it is assumed that the timer 4 mounted in the other vehicle VCB, VCC is in advance of the timer 4 mounted in the own vehicle VCA by a time difference ΔT0B, ΔT0C.

$$TBk-TAm=TAB+\Delta T0B \quad (10)$$

$$TAn-TBh=TBA-\Delta T0B \quad (11)$$

$$TCi-TAm=TAC+\Delta T0C \quad (12)$$

$$TAn-TCj=TCA-\Delta T0C \quad (13)$$

By substituting the above-mentioned equations (10) and (11) into the equation (8), the following equation (14) is obtained.

$$\Delta T0=(TAB-TBA)/2+\Delta T0B \quad (14)$$

In the same manner, by substituting the above-mentioned equations (12) and (13) into the equation (9), the following equation (15) is obtained.

$$\Delta T0=(TAC-TCA)/2+\Delta T0C \quad (15)$$

Here, when TAB, TAC, which is the time period required for a radio wave transmitted from the own vehicle VCA to reach the other vehicle VCB (or the other vehicle VCC), is coincident with TBA, TCA, which is the time period required for a radio wave transmitted from the other vehicle VCB (or the other vehicle VCC) to reach the own vehicle VCA, the following equations (16) and (17) are obtained.

$$\Delta T0=\Delta T0B \quad (16)$$

$$\Delta T0=\Delta T0C \quad (17)$$

In this manner, by the above-mentioned equation (7), the time measurement lag ΔT0 can be obtained. Here, a condition for making the time periods TAB and TBA substantially equal to each other (for making a difference between the time periods TAB and TBA sufficiently smaller than the time measurement lag ΔT0) is that the distance LB between the own vehicle VCA and the other vehicle VCB is substantially unchanged during a period from a time point when a radio wave is transmitted from the own vehicle VCA to when the radio wave reaches the other vehicle VCB and then a radio wave transmitted from the other vehicle VCB reaches the own vehicle VCA. That is, the condition is that a communication interval between the own vehicle VCA and the other vehicle VCB, VCC is sufficiently short.

Next, the fact that the distance LB, LC can be obtained by the above-mentioned equation (1) will be described. By substituting the equations (3) and (5) into the above-mentioned equation (1), the following equation (18) is obtained.

$$LB=((TAn-TBh)+(TBk-TAm))/2\times C \quad (18)$$

In the same manner, by substituting the equations (4) and (6) into the above-mentioned equation (1), the following equation (19) is obtained.

$$LC=((TAn-TCj)+(TCi-TAm))/2\times C \quad (19)$$

Furthermore, by substituting the above-mentioned equations (10) and (11) into the equation (18), the following equation (20) is obtained.

$$LB=(TAB+TBA)/2\times C \quad (20)$$

In the same manner, by substituting the equations (10) and (11) into the equation (19), the following equation (21) is obtained.

$$LC=(TAC+TCA)/2\times C \quad (21)$$

That is, from the above-mentioned equations (20) and (21), it can be seen that the distance LB, LC can accurately be obtained by the equation (1) because the distance LB, LC, which is obtained by the above-mentioned equation (1), is identical to a result of multiplying, by the speed of light C, an average value of the time period TAB, TAC, which is required for a radio wave transmitted from the own vehicle VCA to reach the other vehicle VCB (or the other vehicle VCC), and the time period TBA, TCA, which is required for a radio wave transmitted from the other vehicle VCB (or the other vehicle VCC) to reach the own vehicle VCA.

In other words, when the timer 4 of the other vehicle VCB (or the other vehicle VCC) is in advance of the timer 4 of the own vehicle VCA by the time ΔT0B, ΔT0C, the second time difference ΔT2 is longer than the time period TAB, TAC required for a radio wave to be transmitted from the own vehicle VCA to the other vehicle VCB (or the other vehicle VCC), by the time ΔT0B, ΔT0C. On the other hand, the first time difference ΔT1 is shorter than the time period TBA, TCA required for a radio wave to be transmitted from the other vehicle VCB (or the other vehicle VCC) to the own vehicle VCA, by the time ΔT0B, ΔT0C. Therefore, by summing the first time difference ΔT1 and the second time difference ΔT2, the influence of the time ΔT0B, ΔT0C can be cancelled. Thus, the distance LB, LC to the other vehicle VCB (or the other vehicle VCC) can accurately be obtained.

Next, the fact that the distance LB, LC can be obtained by the above-mentioned equation (2) will be described. By substituting the equations (8) and (5) into the above-mentioned equation (2), the following equation (22) is obtained.

$$LB=((TAn-TBh)+(TBk-TAm))/2\times C \quad (22)$$

In the same manner, by substituting the equations (9) and (6) into the above-mentioned equation (2), the following equation (23) is obtained.

$$LC=((TAn-TCj)+(TCi-TAm))/2\times C \quad (23)$$

Since the above-mentioned equations (22) and (23) are identical to the above-mentioned equations (18) and (19), respectively, the following equations (24) and (25) are obtained, in the same manner as for the above-mentioned equations (18) and (19).

$$LB=(TAB+TBA)/2\times C \quad (24)$$

$$LC=(TAC+TCA)/2\times C \quad (25)$$

Thus, it can be seen that the distance LB, LC can be obtained by the above-mentioned equation (2).

That is, from the above-mentioned equations (24) and (25), it can be seen that the distance LB, LC can accurately be obtained by the equation (2) because the distance LB, LC, which is obtained by the above-mentioned equation (2), is identical to a result of multiplying, by the speed of light C, an average value of the time period TAB, TAC, which is required for a radio wave transmitted from the own vehicle VCA to reach the other vehicle VCB (or the other vehicle VCC), and the time period TBA, TCA, which is required for a radio wave transmitted from the other vehicle VCB (or the other vehicle VCC) to reach the own vehicle VCA.

In other words, when the timer 4 of the other vehicle VCB (or the other vehicle VCC) is in advance of the timer 4 of the own vehicle VCA by the time ΔT0B, ΔT0C, the first time difference ΔT1 is shorter than the time period TBA, TCA required for a radio wave to be transmitted from the other vehicle VCB (or the other vehicle VCC) to the own vehicle VCA, by the time ΔT0B, ΔT0C. Therefore, by summing the first time difference ΔT1 and the time measurement lag ΔT0, a difference in measurement time between the timer 4 of the other vehicle VCB (or the other vehicle VCC) and the timer 4 of the own vehicle VCA can be corrected. Thus, the distance LB, LC to the other vehicle VCB (or the other vehicle VCC) can accurately be obtained.

In the first embodiment, a description is given of a case where the distance calculation section 105 obtains the distance L based on a time period for one round-trip transmission of the radio wave. However, the distance calculation section 105 may obtain the distance L, based on a time period for two or more round-trip transmission of the radio wave. In such a case, the distance L can be obtained with an increased accuracy.

The time measurement lag recording section 112 (corresponding to a time measurement lag recording part) is a functional section that, when the first determination section 108 determines that there is a coincidence, records time measurement lag information representing a time measurement lag ΔT0, which is obtained by the time measurement lag calculation section 111, into the time measurement lag storage section 110, so as to associate the time measurement lag information representing the time measurement lag ΔT0 with the other vehicle identification information IDB (or the other vehicle identification information IDC) included in the first output information FB1*k* (or the first output information FC1*i*) which is received simultaneously with the second output information FB2*k* (or the second output information FC2*i*).

In the first embodiment, a description is given of a case where the time measurement lag ΔT0, for each of the other vehicles VCB, VCC, is obtained and recorded into the time measurement lag storage section 110, only once, by the time measurement lag calculation section 111 and the time measurement lag recording section 112. However, it may also be acceptable that the time measurement lag calculation section 111 and the time measurement lag recording section 112 update the time measurement lag ΔT0 stored in the time measurement lag storage section 110, at predetermined intervals (for example, every one second) which is predetermined. In such a case, the distance LB, LC can be obtained with an increased accuracy.

The second determination section 113 (corresponding to a second determination part) is a functional section that, when the reception control section 103 receives first output information FB1*k* (or first output information FC1*i*) from the other vehicle VCB (or the other vehicle VCC), determines whether or not other vehicle identification information included in the received first output information FB1*k* (or first output information FC1*i*) is coincident with any of the other vehicle identification information IDB, IDC stored in the time measurement lag storage section 110.

As described above, when the second determination section 113 determines that other vehicle identification information included in the received first output information FB1*h* (or first output information FC1*j*) is coincident with any of the other vehicle identification information IDB, IDC stored in the time measurement lag storage section 110, a time measurement lag ΔT0 that corresponds to the other vehicle identification information IDB (or the other vehicle identification information IDC) determined as being coincident is read from the time measurement lag storage section 110, and a distance LB, LC is obtained based on the equation (2).

Here, the time measurement lag information representing the time measurement lag ΔT0 that is stored in the time measurement lag storage section 110 and that corresponds to the other vehicle identification information included in the first output information FB1*h* (or the first output information FC1*j*) is information of a difference in measurement time between the timer 4 mounted in the other vehicle VCB (or the other vehicle VCC) and the timer 4 mounted in the own vehicle VCA. Accordingly, the difference in measurement time between the timer 4 mounted in the other vehicle VCB (or the other vehicle VCC) and the timer 4 mounted in the own vehicle VCA can be corrected. Therefore, the distance LB, LC to the other vehicle VCB (or the other vehicle VCC) can accurately be detected by a simple configuration.

The collision prediction section 114 (corresponding to a collision prediction part) is a functional section that estimates a collision time, at which a collision with the other vehicle VCB (or the other vehicle VCC) is predicted to occur, based on the distance LB, LC obtained by the distance calculation section 105. Specifically, the collision prediction section 114 estimates the collision time, based on a change with time of the distance LB, LC obtained by the distance calculation section 105. An example of a method for calculating the collision time will be described later with reference to FIG. 7.

The direction detection section 115 (corresponding to a direction detection part) is a functional section that obtains, based on the own vehicle VCA as a reference, a direction in which the other vehicle VCB (or the other vehicle VCC), to which the distance LB, LC has been obtained by the distance calculation section 105, is present. Specifically, the direction detection section 115 obtains a direction in which the other vehicle VCB (or the other vehicle VCC) is present, based on a direction from which a radio wave signal of the other vehicle VCB (or the other vehicle VCC) comes. More specifically, the direction detection section 115 obtains the direction from which the radio wave signal of the other vehicle VCB (or the other vehicle VCC) comes, based on a phase difference between radio wave signals received from the other vehicle VCB (or the other vehicle VCC) by a plurality of antennas 331, 332.

Figure 6:
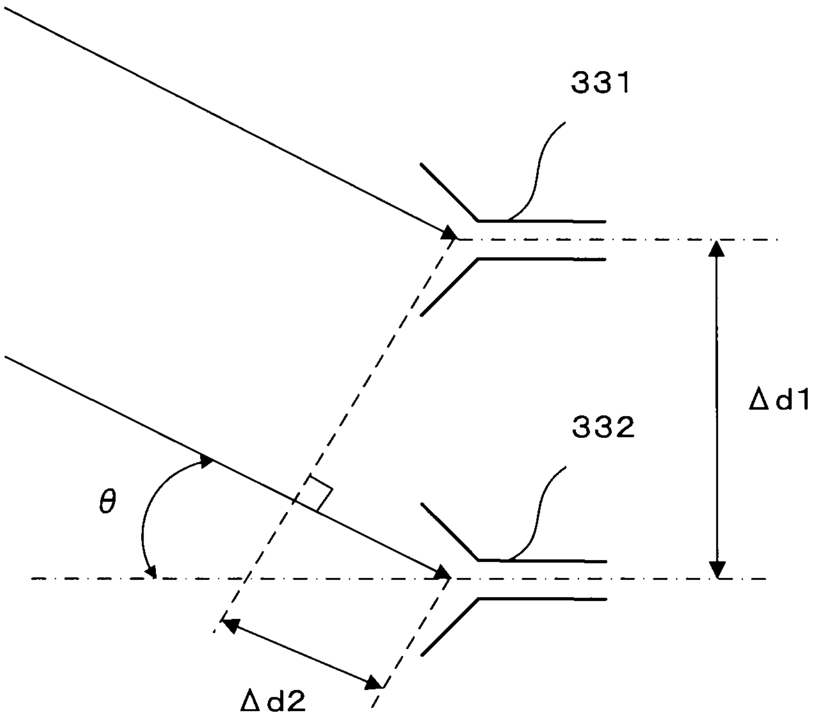
FIG. 6 is a schematic diagram showing an example of how to detect an angle θ which defines a direction in which the other vehicle is present.

FIG. 6 is a schematic diagram showing an example of how the direction detection section 115 detects an angle θ which defines a direction in which the other vehicle VCB (or the other vehicle VCC) is present. As shown in the FIG. 6, in the receiving antenna 33 (see FIG. 1), the receiving antennas 331, 332 having substantially the same characteristics are arranged side by side in a lateral direction (=a direction perpendicular to the central axis of the own vehicle VCA) so as to be spaced from each other by an interval Δd1.

Radio waves of the other vehicle VCB (or the other vehicle VCC) are incident on the receiving antennas 331, 332, from an upper right side area having an azimuth θ with respect to the central axis of the own vehicle VCA, which is indicated by alternate long and short dash lines in FIG. 6. In this case, the radio wave incident on the receiving antenna 332 is delayed behind the radio wave incident on the receiving antenna 331, by a distance Δd2. The distance Δd2 is represented by the following equation (26), using the interval Δd1 between the receiving antennas 331 and 332.

$$\Delta d2 = \Delta d1 \times \sin\theta \quad (26)$$

The radio wave incident on the receiving antenna 332 is delayed behind the radio wave incident on the receiving antenna 331, by a phase difference Δψ which is represented by the following equation (27) using the above-mentioned distance Δd2 and a wavelength λ of the radio wave.

$$\Delta\psi = 2\pi \times \Delta d2/\lambda \quad (27)$$

By substituting the above-mentioned equation (26) into the equation (27), the following equation (28) is obtained.

$$\Delta\psi = 2\pi \times \Delta d1 \times \sin\theta/\lambda \quad (28)$$

Thus, by detecting the phase difference Δψ of the radio wave incident on the receiving antenna 332 with respect to the radio wave incident on the receiving antenna 331, the azimuth θ can be obtained based on the above-mentioned equation (28). This method is called a "phase comparison monopulse method".

In this manner, the direction detection section 115 obtains the azimuth θ by the phase comparison monopulse method. Therefore, the accurate azimuth θ can be obtained by a simple configuration.

Returning to FIG. 2, the functional configuration of the collision determination ECU 1 will be described. The collision determination section 116 (corresponding to a collision determination part) is a functional section that determines whether or not there is a high possibility of a collision with the other vehicle VCB (or the other vehicle VCC), based on the distance LB, LC obtained by the distance calculation section 105. Specifically, the collision determination section 116 determines whether or not there is a high possibility of a collision with the other vehicle VCB (or the other vehicle VCC), based on the collision time, which has been estimated by the collision prediction section 114, and the direction in which the other vehicle VCB (or the other vehicle VCC) is present, which has been obtained by the direction detection section 115.

Figure 7:
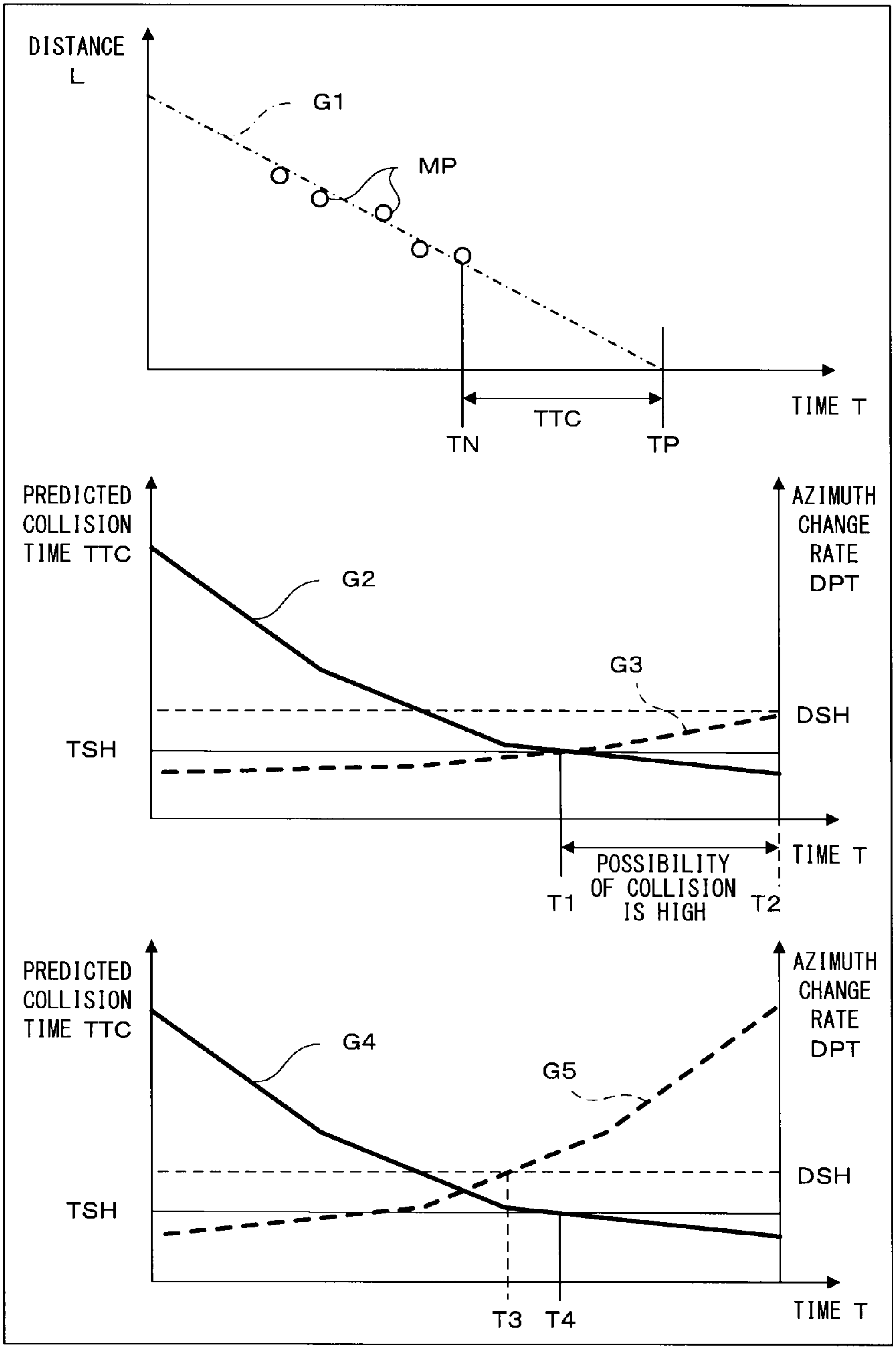
FIG. 7 shows graphs illustrating an example of a time period until a collision time and an azimuth change rate.

More specifically, the collision determination section 116 determines that there is a high possibility of a collision with the other vehicle VCB (or the other vehicle VCC), when a time period TTC until the collision time is equal to or less than a predetermined threshold value TSH and in addition an azimuth change rate DPT, which indicates the degree of change per unit time of the direction in which the other vehicle VCB (or the other vehicle VCC) is present, is equal to or less than a predetermined threshold value DSH (see FIG. 7).

FIG. 7 shows graphs illustrating an example of the time period TTC until the collision time and the azimuth change rate DPT. FIG. 7 shows, in its upper part, a graph showing an example of how the collision prediction section 114 obtains the time period TTC until the collision time. In FIG. 7, the horizontal axis represents time, and the vertical axis represents the distance L obtained by the distance calculation section 105. The measurement point MP is a point representing the distance L obtained by the distance calculation section 105. As shown in FIG. 7, the collision prediction section 114 approximates, to a straight line, the measurement points MP detected by the distance calculation section 105, so as to form a graph G1. The collision prediction section 114 estimates, as the collision time, a time point TP at which the graph G1 intersects the horizontal axis. In other words, the collision prediction section 114 obtains a time period from the current time point TN to the time point TP indicating the collision time, as a predicted collision time TTC.

FIG. 7 shows, in its middle and lower part, graphs showing an example of how the collision determination section 116 determines a possibility of a collision. The horizontal axis represents time. The vertical axis represents the predicted collision time TTC obtained by the collision prediction section 114, and the azimuth change rate DPI. Here, the azimuth change rate DPT indicates the degree of change, per unit time, of the direction in which the other vehicle VCB (or the other vehicle VCC) is present, and is represented by the following equation (29).

$$DPT = \Delta\theta/\Delta T \quad (29)$$

Here, Δθ represents the change amount of the angle θ per unit time, and ΔT represents the unit time.

In the middle part, a graph G2 indicated by a solid line is a graph showing a change of the predicted collision time TTC, and a graph G3 indicated by a broken line is a graph showing a change of the azimuth change rate DPT. As shown in the diagram, in a period on or after the time point T1, the predicted collision time TTC is equal to or less than the threshold value TSH. In a period before a time point T2 (>the time point T1), the azimuth change rate DPT is equal to or less than the threshold value DSH. Therefore, the collision determination section 116 determines that there is a high possibility of a collision, in the period from the time point T1 to the time point T2.

In the lower part, a graph G4 indicated by a solid line is a graph showing a change of the predicted collision time TTC, and a graph G5 indicated by a broken line is a graph showing a change of the azimuth change rate DPT. As shown in the diagram, in a period on or after the time point T4, the predicted collision time TTC is equal to or less than the threshold value TSH. However, in a period on or after a time point T3 (<the time point T4), the azimuth change rate DPT is higher than the threshold value DSH. Therefore, the collision determination section 116 does not determine that there is a high possibility of a collision.

In this manner, the collision determination section 116 determines whether or not there is a high possibility of a collision, based on the predicted collision time TTC and the azimuth change rate DPT. Therefore, whether or not there is a high possibility of a collision with the other vehicle VCB (or the other vehicle VCC) is accurately determined.

That is, for example, in a situation where the other vehicle VCC traveling in the opposite lane passes by the own vehicle VCA (see FIG. 3), when the other vehicle VCC approaches the own vehicle VCA, the predicted collision time TTC becomes equal to or less than the threshold value TSH, but the azimuth change rate DPT does not become equal to or less than the threshold value DSH (the closer the other vehicle VCC comes, the higher the azimuth change rate DPT becomes). Therefore, it is not determined that there is a high possibility of a collision with the other vehicle VCC. On the other hand, for example, in a situation where a collision at intersection may occur at a T-junction or the like (see FIG. 3), when the other vehicle VCB approaches the own vehicle, the predicted collision time TTC becomes equal to or less than the threshold value TSH and in addition the azimuth change rate DPT also becomes equal to or less than the threshold value DSH (when the other vehicle VCB comes close, the value of the azimuth change rate DPT becomes small). Therefore, it is determined that there is a high possibility of a collision with the other vehicle VCB. In this manner, whether or not there is a high possibility of a collision with the other vehicle VCB, VCC and the like can accurately be determined.

In the first embodiment, a description is given of a case where the collision determination section 116 determines whether or not there is a high possibility of a collision, based on the predicted collision time TTC and the azimuth change rate DPT. However, it may also be acceptable that the collision determination section 116 determines whether or not there is a high possibility of a collision, based on the amount of change of the angle θ per unit distance, instead of (or in addition to) the azimuth change rate DPT.

Figure 8:
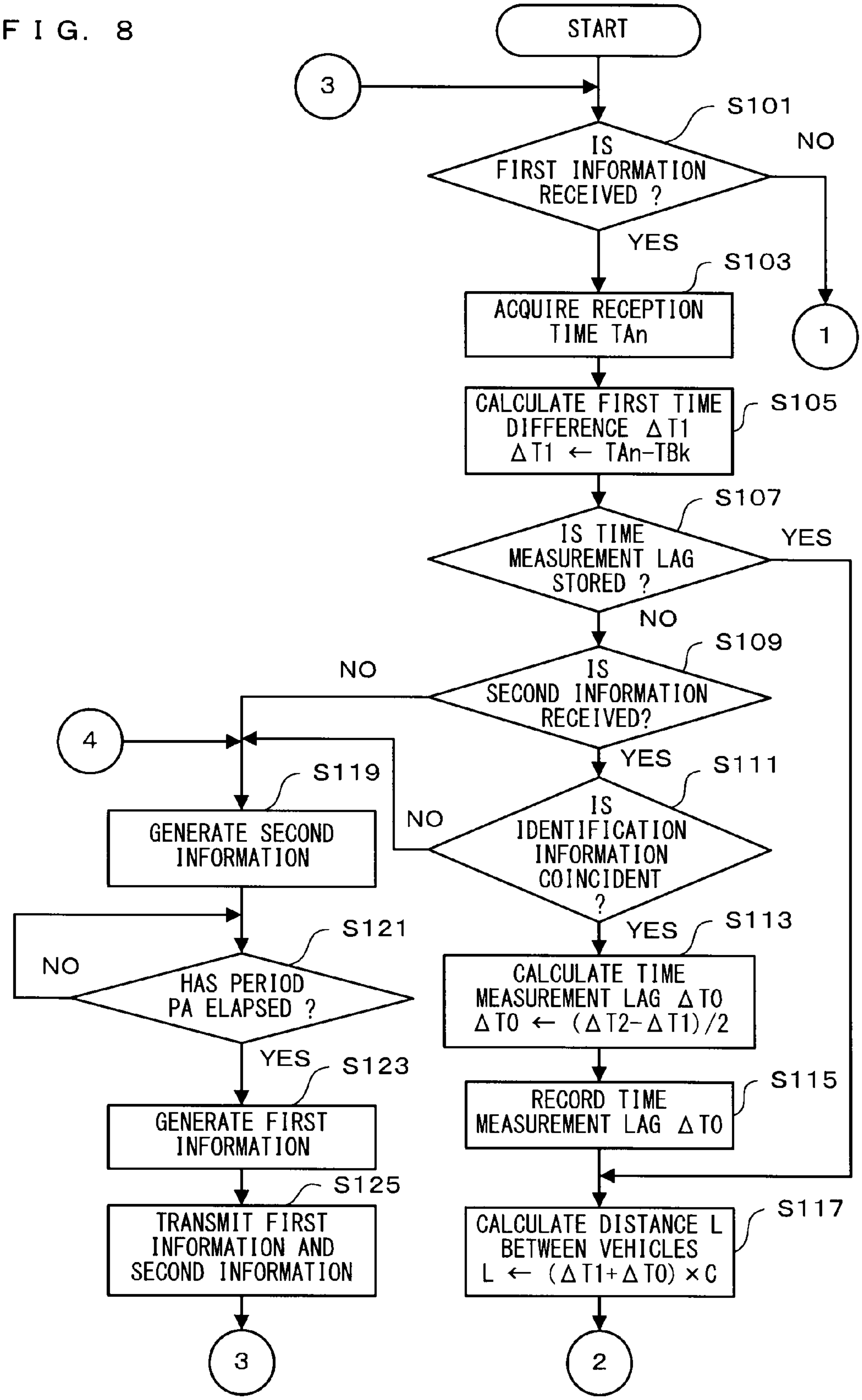
FIG. 8 shows a flow chart (the first part) illustrating an exemplary operation of the collision determination ECU according to the first embodiment.
Figure 9:
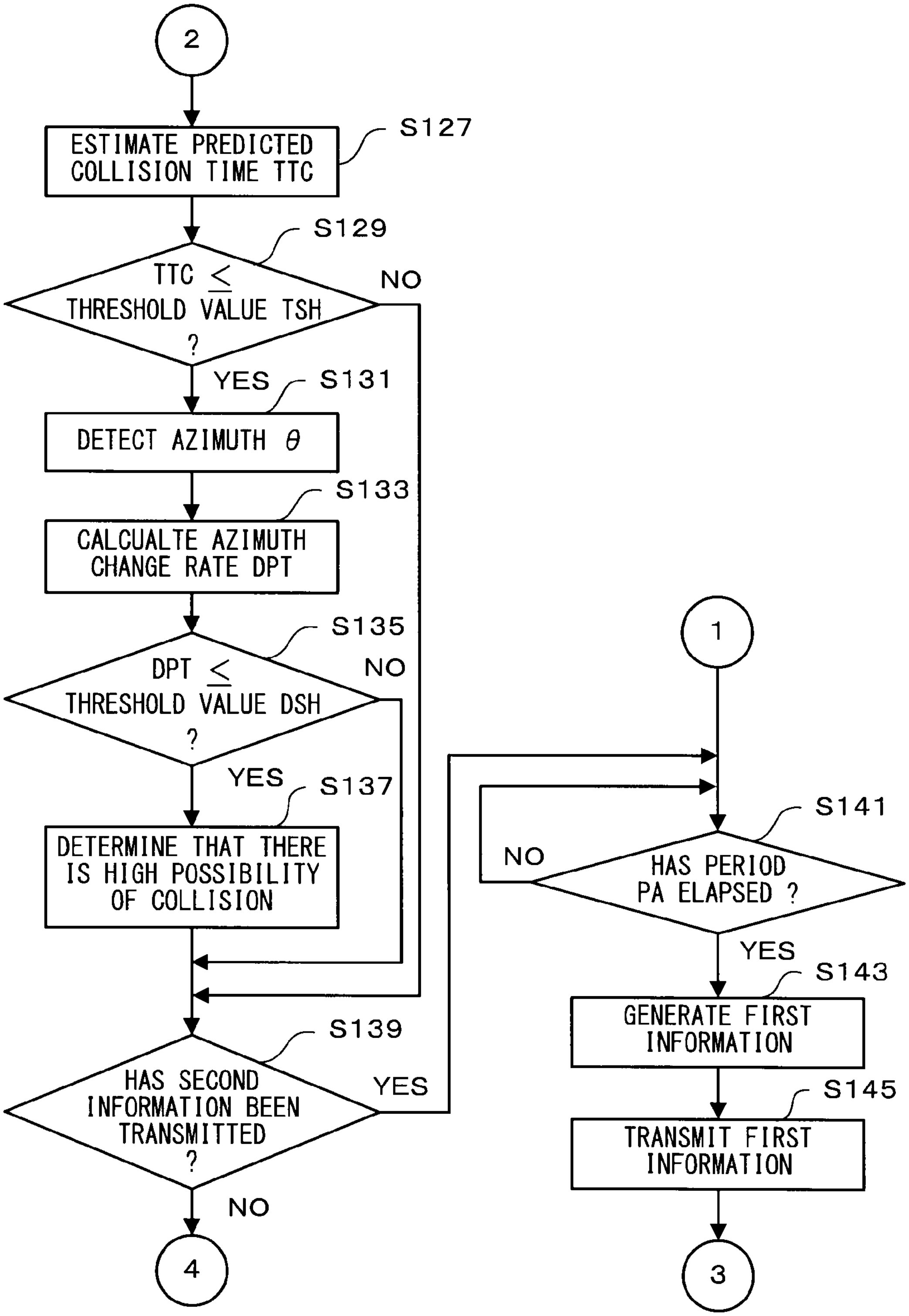
FIG. 9 shows a flow chart (the second part) illustrating the exemplary operation of the collision determination ECU according to the first embodiment.

FIGS. 8 and 9 show a flow chart illustrating an exemplary operation of the collision determination ECU 1 according to the first embodiment. It should be noted that, in FIGS. 8 and 9, for the sake of convenience, the first output information and the second output information are abbreviated as "first information" and "second information", respectively. Firstly, as shown in FIG. 8, whether or not the reception control section 103 has received first output information from the other vehicle VCB (or the other vehicle VCC) is determined (S101). When it is determined that first output information has not been received (NO in S101), the processing advances to step S141 which is shown in FIG. 9. When it is determined that first output information has been received (YES in S101), the reception time acquisition section 104 acquires the reception time TAn from the timer 4 (S103). Then, based on the first output information received in step S101 and the reception time TAn acquired in step S103, the time difference calculation section 106 calculates the first time difference ΔT1 (S105).

Subsequently, the second determination section 113 determines whether or not other vehicle identification information included in the first output information received in step S101 is coincident with any of other vehicle identification information IDB, IDC stored in the time measurement lag storage section 110 (whether or not a time measurement lag ΔT0 is stored) (S107). When it is determined that the time measurement lag ΔT0 is stored (YES in S107), the processing advances to step S117. When it is determined that the time measurement lag ΔT0 is not stored (NO in S107), whether or not the reception control section 103 has received second output information together with the first output information received in step S101 is determined (S109). When it is determined that second output information has not been received (NO in S109), the processing advances to step S119. When it is determined that second output information has been received (YES in S109), the first determination section 108 determines whether or not identification information included in the second output information received in step S109 is coincident with the own vehicle identification information IDA (S111). When it is determined that the identification information is not coincident with the own vehicle identification information IDA (NO in S111), the processing advances to step S119. When it is determined that the identification information is coincident with the own vehicle identification information IDA (YES in S111), the time measurement lag calculation section 111 calculates a time measurement lag ΔT0 based on the first time difference ΔT1 obtained in step S105 and a second time difference ΔT2 included in the second output information received in step S109 (S113). Then, the time measurement lag recording section 112 writes the time measurement lag ΔT0 calculated in step S113 into the time measurement lag storage section 110 so as to associate the time measurement lag ΔT0 with the identification information included in the first output information received in step S101 (S115). When YES in step S107, or when the processing of step S115 is completed, the distance calculation section 105 calculates a distance L based on the first time difference ΔT1 obtained in step S105 and the time measurement lag ΔT0 stored in the time measurement lag storage section 110 (S117), and the processing advances to step S127 which is shown in FIG. 9.

When NO in step S109, NO in step S111, or NO in step S139 which will be described later with reference to FIG. 9, the second information generation section 107 generates second output information (S119). Then, the transmission control section 102 determines whether or not the predetermined time period PA (here, 50 msec) has elapsed (S121). When it is determined that the predetermined time period PA has not elapsed (NO in S121), the processing enters a standby state. When it is determined that the predetermined time period PA has elapsed (YES in S121), the first information generation section 101 generates first output information (S123). Then, the transmission control section 102 transmits the first output information generated in step S123 and the second output information generated in step S119 (S125). Then, the processing returns to step S101, and step S101 and subsequent steps are repeatedly executed.

When the processing of step S117 is completed, as shown in FIG. 9, the collision prediction section 114 obtains a predicted collision time TTC based on the distance L calculated in step S117 of FIG. 8 (S127). Then, the collision determination section 116 determines whether or not the predicted collision time TTC obtained in step S127 is equal to or less than the threshold value TSH (S129). When it is determined that the predicted collision time TTC is larger than the threshold value TSH (NO in S129), the processing advances to step S139. When it is determined that the predicted collision time TTC is equal to or less than the threshold value TSH (YES in S129), the direction detection section 115 detects an azimuth θ of the other vehicle to which the distance L has been calculated in step S117 of FIG. 8 (S131). Then, the collision determination section 116 calculates an azimuth change rate DPT based on the azimuth θ detected in step S131 (S133). Subsequently, the collision determination section 116 determines whether or not the azimuth change rate DPT calculated in step S133 is equal to or less than the threshold value DSH (S135). When it is determined that the azimuth change rate DPT is higher than the threshold value DSH (NO in S135), the processing advances to step S139. When it is determined that the azimuth change rate DPT is equal to or less than the threshold value DSH (YES in S135), the collision determination section 116 determines that there is a high possibility of a collision with the other vehicle to which the distance L has been calculated in step S117 of FIG. 8 (S137).

When NO in step S129 or NO in step S135, or when the processing of step S137 is completed, the inhibition section 109 determines whether or not second output information corresponding to the other vehicle to which the distance L was calculated in step S117 of FIG. 8 has been transmitted (S139). Here, the second output information corresponding to the other vehicle to which the distance L was calculated is second output information that includes, as the aforesaid other vehicle identification information, own vehicle identification information of the other vehicle to which the distance L was calculated. When it is determined that the second output information has not been transmitted (NO in S139), the processing advances to step S119 shown in FIG. 8. When it is determined that the second output information has been transmitted (YES in S139), or when NO in step S101 of FIG. 8, the transmission control section 102 determines whether or not the predetermined time period PA (here, 50 msec) has elapsed (S141). When it is determined that the predetermined time period PA has not elapsed (NO in S141), the processing enters a standby state. When it is determined that the predetermined time period PA has elapsed (YES in S141), the first information generation section 101 generates first output information (S143). Then, the transmission control section 102 transmits the first output information generated in step S143 (S145). Then, the processing returns to step S101 shown in FIG. 8, and step S101 and subsequent steps are repeatedly executed.

Second Embodiment

FIG. 10 is a block diagram showing an example of a functional configuration of the collision determination ECU 1A according to a second embodiment. The collision determination ECU 1A functionally includes a first information generation section 101, a transmission control section 102, a reception control section 103, a reception time acquisition section 104, a distance calculation section 105A, a time difference calculation section 106, a second information generation section 107A, a first determination section 108, a time difference storage section 110A, a time difference recording section 112A, a second determination section 113A, a collision prediction section 114, a direction detection section 115, and a collision determination section 116.

The collision determination ECU 1A causes a micro computer, which is arranged at an appropriate position in the collision determination ECU 1A, to execute a control program prestored in an ROM (Read Only Memory) or the like which is arranged at an appropriate position in the collision determination ECU 1A, and thereby causes the micro computer to function as functional sections such as the first information generation section 101, the transmission control section 102, the reception control section 103, the reception time acquisition section 104, the distance calculation section 105A, the time difference calculation section 106, the second information generation section 107A, the first determination section 108, the time difference storage section 110A, the time difference recording section 112A, the second determination section 113A, the collision prediction section 114, the direction detection section 115, and the collision determination section 116.

A distance detection device according to the second embodiment includes: the transmission section 2, the reception section 3, and the timer 4 shown in FIG. 1; and, among the functional sections of the collision determination ECU 1A, the first information generation section 101, the transmission control section 102, the reception control section 103, the reception time acquisition section 104, the distance calculation section 105A, the time difference calculation section 106, the second information generation section 107A, the first determination section 108, the time difference storage section 110A, the time difference recording section 112A, and the second determination section 113A.

The collision determination ECU 1A is different from the collision determination ECU 1 shown in FIG. 2, in that the collision determination ECU 1A does not include the inhibition section 109 and the time measurement lag calculation section 111, and includes the distance calculation section 105A, the second information generation section 107A, the time difference storage section 110A, the time difference recording section 112A, and the second determination section 113A, instead of the distance calculation section 105, the second information generation section 107, the time measurement lag storage section 110, the time measurement lag recording section 112, and the second determination section 113, respectively. Therefore, in the following description, the functional sections different from those of the collision determination ECU 1 will be mainly described. The same functional sections as those of the collision determination ECU 1 are denoted by the same corresponding reference numerals, respectively, and descriptions thereof will be omitted.

Similarly to the distance calculation section 105 according to the first embodiment, the distance calculation section 105A (corresponding to a distance calculation part) is a functional section that obtains a distance LB, LC (see FIG. 3) to the other vehicle VCB, VCC, based on: other vehicle time information included in the first output information FB1*h*, FC1*j* received by the reception control section 103; and the reception time information acquired by the reception time acquisition section 104.

Moreover, when the first determination section 108 determines that other vehicle identification information included in the second output information FB2*k* (or second output information FC2*i*) received by the reception control section 103 is coincident with the own vehicle identification information IDA, the distance calculation section 105A obtains, similarly to the distance calculation section 105 according to the first embodiment, the distance LB (or the distance LC) to the other vehicle VCB (or the other vehicle VCC), based on second time difference information representing a second time difference ΔT2, which is first time difference information representing a first time difference included in the second output information FB2*k* (or the second output information FC2*i*) received by the reception control section 103.

To be specific, when the reception control section 103 receives the second output information FB2*k* (or the second output information FC2*i*), the distance calculation section 105A obtains, similarly to the distance calculation section 105 according to the first embodiment, an average value of a first time difference ΔT1, which is obtained by the time difference calculation section 106, and a second time difference ΔT2, which is included in the second output information FB2*k* (or the second output information FC2*i*) received by the reception control section 103. The distance calculation section 105A multiplies the obtained average value by the speed of light C, to thereby obtain the distance LB, LC (see FIG. 3) to the other vehicle VCB, VCC. That is, the distance calculation section 105A obtains the distance L (LB, LC), based on the following equation (30). The reason why the distance LB, LC can be obtained by the equation (30) is the same as the reason why the distance calculation section 105 according to the first embodiment can obtain the distance LB, LC by the above-mentioned equation (1). Although the following equation (30) is the same as the equation (1) used in the description of the distance calculation section 105 according to the first embodiment, the equation is renumbered and indicated again, for the sake of convenience.

$$L=(\Delta T1+\Delta T2)/2\times C \quad (30)$$

When the second determination section 113A determines that other vehicle identification information which is included in the received first output information FB1*h* (or first output information FC1*j*) is coincident with any of the other vehicle identification information IDB, IDC which is stored in the time difference storage section 110A, the distance calculation section 105A: obtains an average value of the first time difference ΔT1, which is obtained by the time difference calculation section 106, and the time difference ΔT2, which is read from the time difference storage section 110A; and multiplies the obtained average value by the speed of light C, to thereby obtain the distance LB, LC (see FIG. 3) to the other vehicle VCB, VCC. That is, the distance calculation section 105A obtains the distance L (LB, LC) based on the above-mentioned equation (30).

Similarly to in the distance calculation section 105 according to the first embodiment, from the above-mentioned equations (20) and (21) which have been indicated in the description of the first embodiment, it can be seen that the distance LB, LC can accurately be obtained by the equation (30) because the distance LB, LC, which is obtained by the above-mentioned equation (30), is identical to a result of multiplying, by the speed of light C, an average value of the time period TAB, TAC, which is required for a radio wave transmitted from the own vehicle VCA to reach the other vehicle VCB (or the other vehicle VCC), and the time period TBA, TCA, which is required for a radio wave transmitted from the other vehicle VCB (or the other vehicle VCC) to reach the own vehicle VCA.

In other words, when the timer 4 of the other vehicle VCB (or the other vehicle VCC) is in advance of the timer 4 of the own vehicle VCA by the time ΔT0B, ΔT0C, the second time difference ΔT2 is longer than the time period TAB, TAC required for a radio wave to be transmitted from the own vehicle VCA to the other vehicle VCB (or the other vehicle VCC), by the time ΔT0B, ΔT0C. On the other hand, the first time difference ΔT1 is shorter than the time period TBA, TCA required for a radio wave to be transmitted from the other vehicle VCB (or the other vehicle VCC) to the own vehicle VCA, by the time ΔT0B, ΔT0C. Therefore, by summing the first time difference ΔT1 and the second time difference ΔT2, the influence of the time ΔT0B, ΔT0C can be cancelled. Thus, the distance LB, LC to the other vehicle VCB (or the other vehicle VCC) can accurately be obtained.

The second information generation section 107A (corresponding to a second information generation part) is a functional section that, when the reception control section 103 receives at least one of the first output information FB1*h* and the first output information FC1*j*, associates the first time difference information representing the first time difference ΔT1 obtained by the time difference calculation section 106, with at least one of the other vehicle identification information IDB and the other vehicle identification information IDC received by the reception control section 103, to thereby generate second output information FA2*m* (m: natural number).

That is, when the reception control section 103 receives the first output information FB1*h* and the first output information FC1*j*, the second information generation section 107A (corresponding to the second information generation part) associates pieces of first time difference information representing first time differences ΔT1 obtained by the time difference calculation section 106, respectively with the other vehicle identification information IDB and the other vehicle identification information IDC received by the reception control section 103, to thereby generate the second output information FA2*m*.

When the reception control section 103 receives the first output information FB1*h*, the second information generation section 107A (corresponding to the second information generation part) associates the first time difference information representing the first time difference ΔT1 obtained by the time difference calculation section 106, with the other vehicle identification information IDB received by the reception control section 103, to thereby generate the second output information FA2*m*.

In the same manner, when the reception control section 103 receives the first output information FC1*j*, the second information generation section 107A (corresponding to the second information generation part) associates the first time difference information representing the first time difference ΔT1 obtained by the time difference calculation section 106, with the other vehicle identification information IDC received by the reception control section 103, to thereby generate the second output information FA2*m*.

In the second embodiment, a functional section corresponding to the inhibition section 109 of the collision determination ECU 1 shown in FIG. 2 is not provided. Accordingly, each time the reception control section 103 receives first output information FB1*h* or first output information FC1*j*, the second information generation section 107A generates second output information FA2*m*. Therefore, when communications with two or more other vehicles VCB, VCC is performed, two or more pieces of second output information FA2*m* are simultaneously transmitted via the transmission control section 102 (see FIG. 12).

The time difference storage section 110A (corresponding to a time difference storage part) is a functional section that stores therein second time difference information representing the second time difference ΔT2, which is included in the second output information FB2*k* (or the second output information FC2*i*) transmitted from the other vehicle VCB, VCC, so as to associate the second time difference information representing the second time difference ΔT2 with the other vehicle identification information IDB (or the other vehicle identification information IDC). The second time difference information representing the second time difference ΔT2, and the other vehicle identification information IDB (or the other vehicle identification information IDC), which are stored in the time difference storage section 110A, are written by the time difference recording section 112A. The second time difference information representing the second time difference ΔT2, and the other vehicle identification information IDB (or the other vehicle identification information IDC), which are stored in the time difference storage section 110A, are read by the distance calculation section 105A, the second determination section 113A, and the like.

The time difference recording section 112A (corresponding to a time difference recording part) is a functional section that, when the first determination section 108 determines that there is a coincidence, records, in the time difference storage section 110A, the second time difference information representing the second time difference ΔT2 which is included in the second output information FB2*k* (or the second output information FC2*i*) received by the reception control section 103, so as to associate the second time difference information representing the second time difference ΔT2 with the other vehicle identification information IDB (or the other vehicle identification information IDC) which is included in the first output information FB1*k* (or the first output information FC1*i*) received simultaneously with the second output information FB2*k* (or the second output information FC2*i*).

The second determination section 113A (corresponding to a second determination part) is a functional section that, when the reception control section 103 receives first output information FB1*k* (or first output information FC1*i*) from the other vehicle VCB (or the other vehicle VCC), determines whether or not other vehicle identification information included in the received first output information FB1*k* (or first output information FC1*i*) is coincident with any of the other vehicle identification information IDB, IDC stored in the time difference storage section 110A.

As described above, when the second determination section 113A determines that the other vehicle identification information included in the received first output information FB1*h* (or first output information FC1*j*) is coincident with any of the other vehicle identification information IDB, IDC stored in the time measurement lag storage section 110, second time difference information representing a second time difference ΔT2 that corresponds to the other vehicle identification information IDB (or the other vehicle identification information IDC) determined as being coincident is read from the time difference storage section 110A, and a distance LB, LC is obtained based on the above-mentioned equation (30).

Here, when the timer 4 of the other vehicle VCB (or the other vehicle VCC) is delayed behind the timer 4 of the own vehicle by a time ΔT, the second time difference ΔT2 that is stored in the time difference storage section 110A and that corresponds to the other vehicle identification information included in the first output information FB1*h* (or the first output information FC1*j*) is longer, by the time ΔT, than the time period required for a radio wave to be transmitted from the own vehicle VCA to the other vehicle VCB (or the other vehicle VCC). Accordingly, a difference in measurement time between the timer 4 mounted in the other vehicle VCB (or the other vehicle VCC) and the timer 4 mounted in the own vehicle VCA can be corrected, by using the second time difference ΔT2. Therefore, by a simple configuration, the distance LB (or the distance LC) to the other vehicle VCB (or the other vehicle VCC) can be detected with an increased accuracy.

Figure 11:
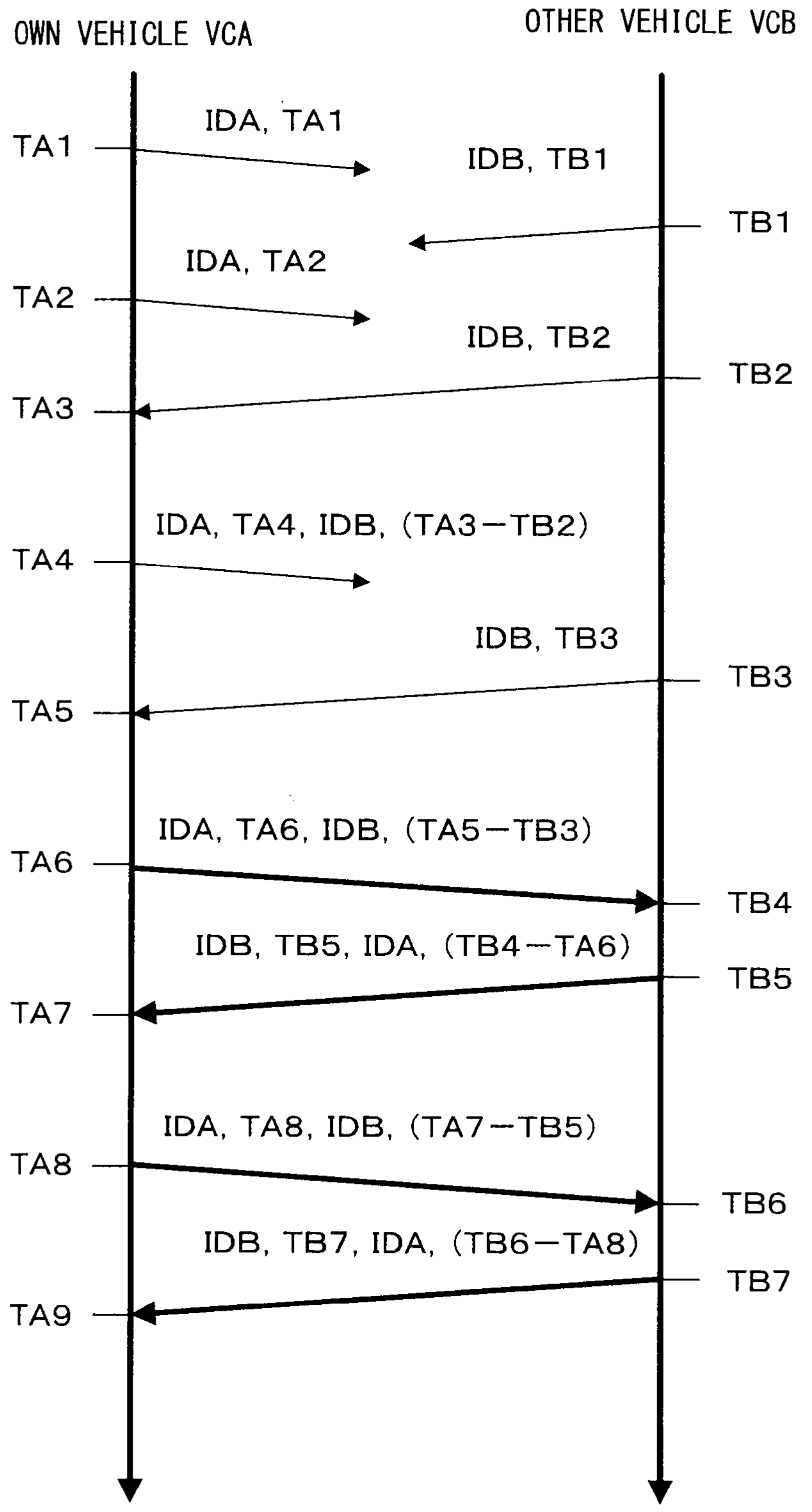
FIG. 11 is a timing chart showing an example of information transmitted and received between the own vehicle VCA and the other vehicle VCB.
Figure 12:
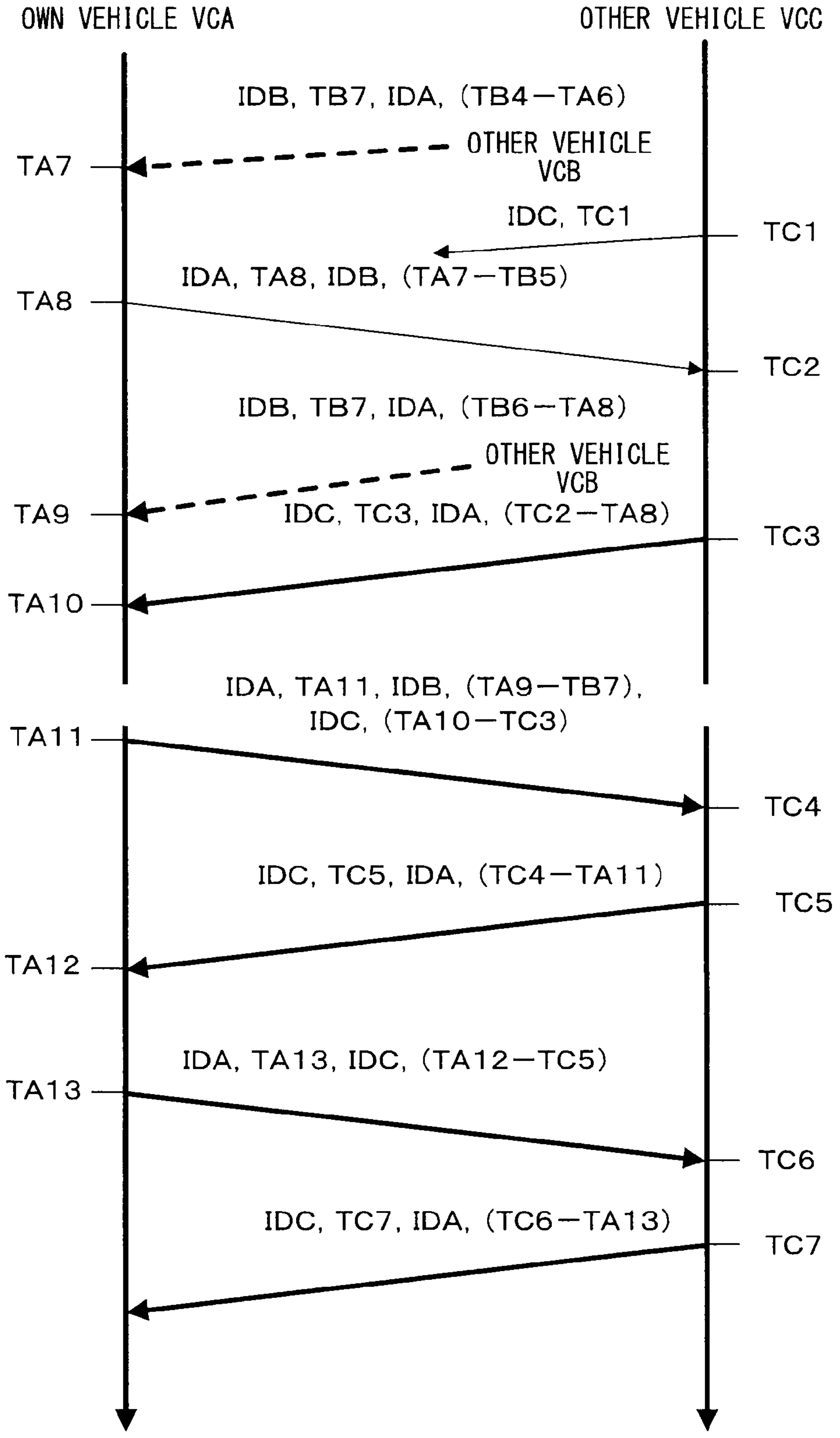
FIG. 12 is a timing chart showing an example of information transmitted and received between the own vehicle VCA and the other vehicle VCC.

FIGS. 11 and 12 are timing charts showing examples of information transmitted and received by the collision determination ECU 1A. FIG. 11 is a timing chart showing an example of information transmitted and received between the own vehicle VCA and the other vehicle VCB. FIG. 12 is a timing chart showing an example of information transmitted and received between the own vehicle VCA and the other vehicle VCC. In FIGS. 11 and 12, the vertical axis represents time, and an arrow pointing diagonally down and right (or diagonally down and left) represents a direction of transmission of transmitted information. A bold arrow pointing diagonally down and right (or diagonally down and left) represents a direction of transmission of transmitted information including second output information. Contents of the transmitted information are shown above each arrow. Moreover, a code (for example, TA1, TB6) near the originating point of each arrow represents a count value of the time 4.

Firstly, with reference to FIG. 11, an example of information transmitted and received between the own vehicle VCA and the other vehicle VCB will be described. At a time point TA1, first output information (IDA, TA1) is transmitted from the own vehicle VCA. Then, at a time point TB1, first output information (IDB, TB1) is transmitted from the other vehicle VCB. Subsequently, at a time point TA2, first output information (IDA, TA2) is transmitted from the own vehicle VCA. Then, at a time point TB2, first output information (IDB, TB2) is transmitted from the other vehicle VCB, and, at a time point TA3, received by the own vehicle VCA. In the own vehicle VCA, since the first output information (IDB, TB2) from the other vehicle VCB is received at the time point TA3, second output information (IDB, (TA3-TB2)) is generated by the second information generation section 107A. At a time point TA4, first output information (IDA, TA4) and the second output information (IDB, (TA3-TB2)) are transmitted from the own vehicle VCA. In the other vehicle VCB, on the other hand, since the first output information from the own vehicle VCA is not received even at a time point TB3, first output information (IDB, TB3) is continuously transmitted from the other vehicle VCB, and received by the own vehicle VCA at a time point TA5.

Then, in the own vehicle VCA, since the first output information (IDB, TB3) from the other vehicle VCB is received at the time point TA5, first output information (IDA, TA6) and second output information (IDB, (TA5-TB3)) are transmitted from the own vehicle VCA at a time point TA6. At a time point TB4, the first output information (IDA, TA6) and the second output information (IDB, (TA5-TB3)) are received by the other vehicle VCB. In the other vehicle VCB, since the second output information (IDB, (TA5-TB3)) from the own vehicle VCA is received at the time point TB4; the distance calculation section 105A obtains a distance LB, and the time difference recording section 112A writes a second time difference ΔT2 into the time difference storage section 110A. In addition, in the other vehicle VCB, since the first output information (IDA, TA6) from the own vehicle VCA is received at the time point TB4, first output information (IDB, TB5) and second output information (IDA, (TB4-TA6)) are transmitted from the other vehicle VCB at a time point TB5. At a time point TA7, the first output information (IDB, TB5) and the second output information (IDA, (TB4-TA6)) are received by the own vehicle VCA.

Next, in the own vehicle VCA, since the second output information (IDA, (TB4-TA6)) from the other vehicle VCB is received at a time point TA7; the distance calculation section 105A obtains a distance LB, and the time difference recording section 112A writes a second time difference ΔT2 into the time difference storage section 110A. In the own vehicle VCA, since the first output information (IDB, TB5) from the other vehicle VCB is received at the time point TA7, first output information (IDA, TA8) and second output information (IDB, (TA7-TB5)) are transmitted at a time point TA8. At a time point TB6, the first output information (IDA, TA8) and the second output information (IDB, (TA7-TB5)) are received by the other vehicle VCB. Then, in the other vehicle VCB, since the second output information (IDB, (TA7-TB5)) from the own vehicle VCA is received at the time point TB6; the distance calculation section 105A obtains a distance LB, and the time difference recording section 112A writes a second time difference ΔT2 into the time difference storage section 110A. In the other vehicle VCB, since the first output information (IDA, TA8) from the own vehicle VCA is received at the time point TB6, first output information (IDB, TB7) and second output information (IDA, (TB6-TA8)) are transmitted at a time point TB7. The first output information (IDB, TB7) and the second output information (IDA, (TB6-TA8)) are received by the own vehicle VCA at a time point TA9. Then, in the own vehicle VCA, the distance calculation section 105A reads, from the time difference storage section 110A, the second time difference ΔT2 that corresponds to identification information IDB included in the first output information, and thus a distance LB is obtained.

Next, with reference to FIG. 12, an example of information transmitted and received between the own vehicle VCA and the other vehicle VCC will be described. Firstly, at a time point TC1, first output information (IDC, TC1) is transmitted from the other vehicle VCC. Then, at the time point TA8, the first output information (IDA, TA8) and the second output information (IDB, (TA7-TB5)) are transmitted from the own vehicle VCA. The first output information (IDA, TA8) and the second output information (IDB, (TA7-TB5)) are received by the other vehicle VCC at a time point TC2. Then, in the other vehicle VCC, since the first output information (IDA, TA8) from the own vehicle VCA is received at the time point TC2, the second information generation section 107A generates second output information (IDA, (TC2-TA8)). At a time point TC3, first output information (IDC, TC3) and the second output information (IDA, (TC2-TA8)) are transmitted from the other vehicle VCC, and, at a time point TA10, received by the own vehicle VCA. Here, at the time point TC2, the other vehicle VCC receives the second output information (IDB, (TA7-TB5)) from the own vehicle VCA. However, since the other vehicle identification information IDB included in the second output information is not coincident with the own vehicle identification information IDC, the time difference recording section 112A of the other vehicle VCC does not write a time difference ΔT2 into the time difference storage section 110A.

Then, in the own vehicle VCA, since the second output information (IDA, (TC2-TA8)) from the other vehicle VCC is received at the time point TA10; the distance calculation section 105A obtains a distance LC, and the time difference recording section 112A writes a time difference ΔT2 into the time difference storage section 110A. In the own vehicle VCA, since the first output information (IDC, TC3) from the other vehicle VCC is received at the time point TA10, first output information (IDA, TA11) and second output information (IDC, (TA10-TC3)) are transmitted from the own vehicle VCA at a time point TA11. The first output information (IDA, TA11) and the second output information (IDC, (TA10-TC3)) are received by the other vehicle VCC at a time point TC4. Here, at the time point TA9, the own vehicle VCA receives the first output information (IDB, TB7) from the other vehicle VCB. Accordingly, at the time point TA11, second output information (IDB, (TA9-TB7)) is also transmitted from the own vehicle VCA.

In the other vehicle VCC, since the second output information (IDC, (TA10-TC3)) from the own vehicle VCA is received at the time point TC4; the distance calculation section 105A obtains a distance LC, and the time difference recording section 112A writes a time difference ΔT2 into the time difference storage section 110A. Then, in the other vehicle VCC, since the first output information (IDA, TA11) from the own vehicle VCA is received at the time point TC4, first output information (IDC, TC5) and second output information (IDA, (TC4-TA11)) are transmitted. At a time point TA12, the first output information (IDC, TC5) and second output information (IDA, (TC4-TA11)) are received by the own vehicle VCA. Since the second output information (IDA, (TC4-TA11)) from the other vehicle VCC is received at the time point TA12; in the own vehicle VCA, the distance calculation section 105A obtains a distance LC, and the time difference recording section 112A writes a second time difference ΔT2 into the time difference storage section 110A. Then, since the first output information (IDC, TC5) from the other vehicle VCC is received at the time point TA12, first output information (IDA, TA13) and second output information (IDC, (TA12-TC5)) are transmitted from the own vehicle VCA at a time point TA13. At a time point TC6, the first output information (IDA, TA13) and the second output information (IDC, (TA12-TC5)) are received by the other vehicle VCC. In the other vehicle VCC, since the second output information (IDC, (TA12-TC5)) is received at the time point TC6, the distance calculation section 105 obtains a distance LC, and the time difference recording section 112A writes a second time difference ΔT2 into the time difference storage section 110A. Then, in the other vehicle VCC, since the first output information (IDA, TA13) is received at the time point TC6, first output information (IDC, TC7) and second output information (IDA, (TC6-TA13)) are transmitted at a time point TC7.

Figure 13:
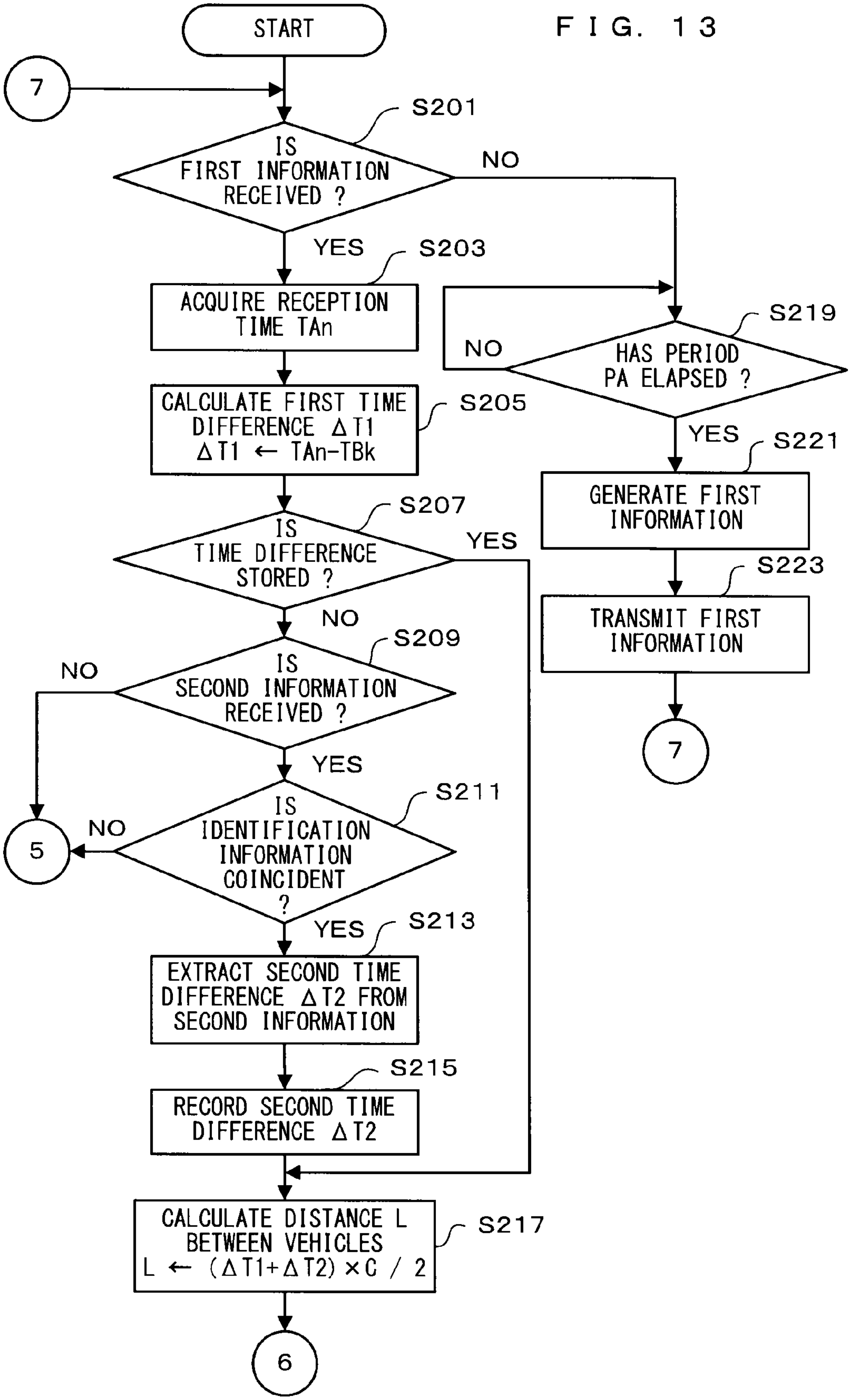
FIG. 13 shows a flow chart (first part) illustrating an exemplary operation of the collision determination ECU according to the second embodiment.
Figure 14:
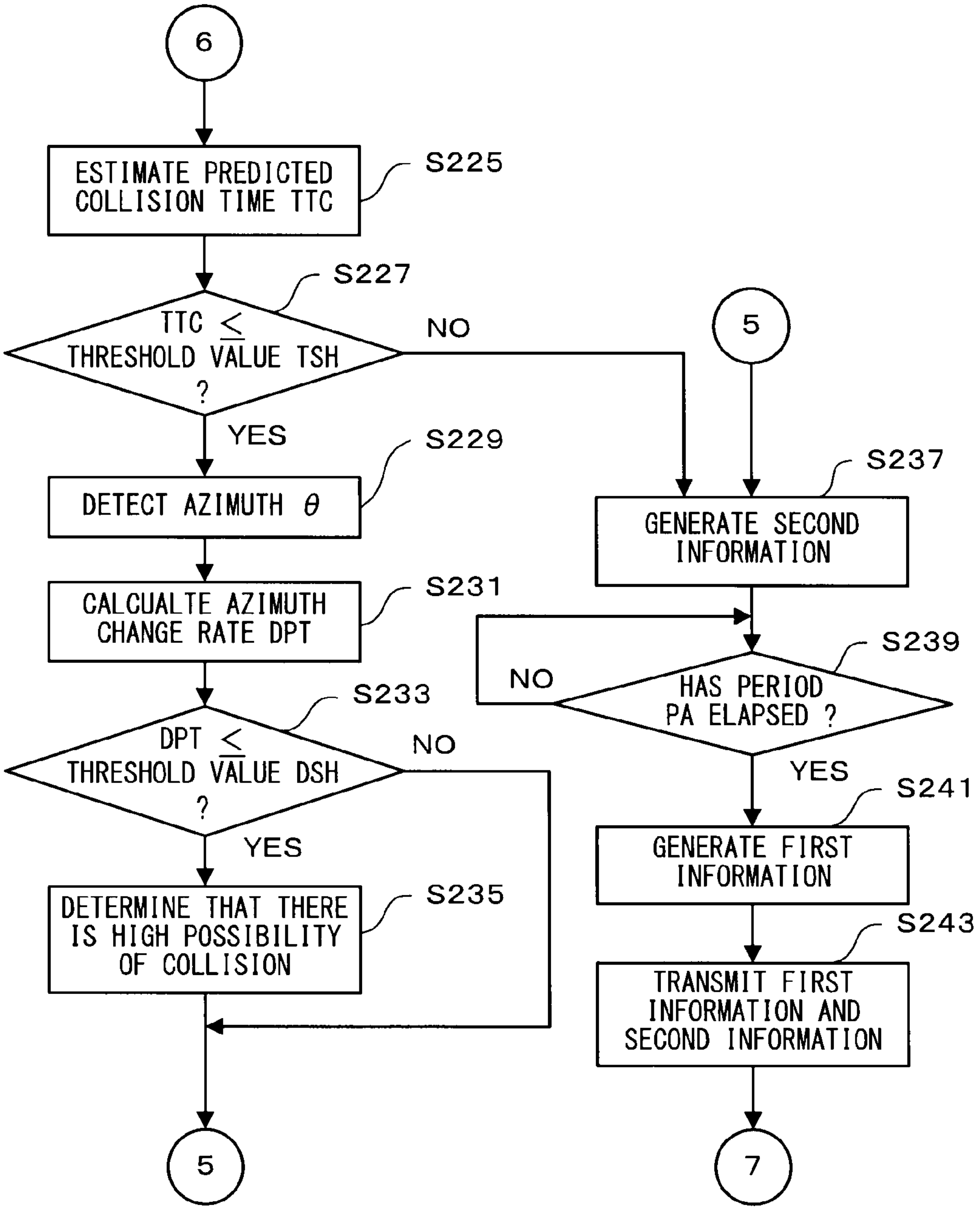
FIG. 14 shows a flow chart (second part) illustrating the exemplary operation of the collision determination ECU according to the second embodiment.

FIGS. 13 and 14 show a flow chart illustrating an exemplary operation of the collision determination ECU 1A according to the second embodiment. It should be noted that, in FIGS. 13 and 14, for the sake of convenience, the first output information and the second output information are abbreviated as "first information" and "second information" respectively. Firstly, as shown in FIG. 13, whether or not the reception control section 103 has received first output information from the other vehicle VCB (or the other vehicle VCC) is determined (S201). When it is determined that first output information has not been received (NO in S201), the processing advances to step S219. When it is determined that first output information has been received (YES in S201), the reception time acquisition section 104 acquires a reception time TAn from the timer 4 (S203). Then, based on the first output information received in step S201 and the reception time TAn acquired in step S203, the time difference calculation section 106 calculates a first time difference ΔT1 (S205).

Subsequently, the second determination section 113A determines whether or not other vehicle identification information included in the first output information received in step S201 is coincident with any of other vehicle identification information IDB, IDC stored in the time difference storage section 110A (=whether or not a second time difference ΔT2 is stored) (S207). When it is determined that the second time difference ΔT2 is stored (YES in S207), the processing advances to step S217. When it is determined that the second time difference ΔT2 is not stored (NO in S207), whether or not the reception control section 103 has received second output information together with the first output information received in step S201 is determined (S209). When it is determined that second output information has not been received (NO in S209), the processing advances to step S237 which is shown in FIG. 14. When it is determined that second output information has been received (YES in S209), the first determination section 108 determines whether or not identification information included in the second output information received in step S209 is coincident with the own vehicle identification information IDA (S211). When it is determined that the identification information is not coincident with the own vehicle identification information IDA (NO in S211), the processing advances to step S237 which is shown in FIG. 14. When it is determined that the identification information is coincident with the own vehicle identification information IDA (YES in S211), the time difference recording section 112A extracts a second time difference ΔT2 which is included in the second output information received in step S109 (S213). Then, the time difference recording section 112A writes, into the time difference storage section 110A, the second time difference ΔT2 extracted in step S213, so as to associate the second time difference ΔT2 with the identification information included in the first output information received in step S201 (S215). When YES in step S207, or when the processing of step S215 is completed, the distance calculation section 105A calculates a distance L based on the first time difference ΔT1 obtained in step S205 and the second time difference ΔT2 stored in the time difference storage section 110A (S219) (S217), and the processing advances to step S225 which is shown in FIG. 14.

When NO in step S201, the transmission control section 102 determines whether or not the predetermined time period PA (here, 50 msec) has elapsed (S219). When it is determined that the predetermined time period PA has not elapsed (NO in S219), the processing enters a standby state. When it is determined that the predetermined time period PA has elapsed (YES in S219), the first information generation section 101 generates first output information (S221). Then, the transmission control section 102 transmits the first output information generated in step S221 (S223). Then, the processing returns to step S201, and step S201 and subsequent steps are repeatedly executed.

When the processing of step S217 is completed, as shown in FIG. 14, the collision prediction section 114 obtains a predicted collision time TTC based on the distance L calculated in step S217 of FIG. 13 (S225). Then, the collision determination section 116 determines whether or not the predicted collision time TTC obtained in step S225 is equal to or less than the threshold value TSH (S227). When it is determined that the predicted collision time TTC is larger than the threshold value TSH (NO in S227), the processing advances to step S237. When it is determined that the predicted collision time TTC is equal to or less than the threshold value TSH (YES in S227), the direction detection section 115 detects an azimuth θ of the other vehicle to which the distance L has been calculated in step S217 of FIG. 13 (S229). Then, the collision determination section 116 calculates an azimuth change rate DPT based on the azimuth θ detected in step S229 (S231). Subsequently, the collision determination section 116 determines whether or not the azimuth change rate DPT calculated in step S231 is equal to or less than the threshold value DSH (S233). When it is determined that the azimuth change rate DPT is higher than the threshold value DSH (NO in S233), the processing advances to step S237. When it is determined that the azimuth change rate DPT is equal to or less than the threshold value DSH (YES in S233), the collision determination section 116 determines that there is a high possibility of a collision with the other vehicle to which the distance L has been calculated in step S217 of FIG. 13 (S235).

When NO in step S209 of FIG. 13, NO in step S211 of FIG. 13, NO in step S227, or NO in step S233, or when the processing of step S235 is completed, the second information generation section 107A generates second output information (S237). Then, the transmission control section 102 determines whether or not the predetermined time period PA (here, 50 msec) has elapsed (S239). When it is determined that the predetermined time period PA has not elapsed (NO in S239), the processing enters a standby state. When it is determined that the predetermined time period PA has elapsed (YES in S239), the first information generation section 101 generates first output information (S241). Then, the transmission control section 102 transmits the first output information generated in step S241 and the second output information generated in step S237 (S243). Then, the processing returns to step S201 which is shown in FIG. 13, and step S201 and subsequent steps are repeatedly executed.

The collision determination device 100 and the distance detection device according to the present invention are not limited to the first embodiment or the second embodiment described above, and the following is also acceptable.

(A) In the description of the first embodiment, the collision determination ECU 1 functionally includes the first information generation section 101, the transmission control section 102, the reception control section 103, the reception time acquisition section 104, the distance calculation section 105, the time difference calculation section 106, the second information generation section 107, the first determination section 108, the inhibition section 109, the time measurement lag storage section 110, the time measurement lag calculation section 111, the time measurement lag recording section 112, the second determination section 113, the collision prediction section 114, the direction detection section 115, the collision determination section 116, and the like. However, at least one of the functional sections including the first information generation section 101, the transmission control section 102, the reception control section 103, the reception time acquisition section 104, the distance calculation section 105, the time difference calculation section 106, the second information generation section 107, the first determination section 108, the inhibition section 109, the time measurement lag storage section 110, the time measurement lag calculation section 111, the time measurement lag recording section 112, the second determination section 113, the collision prediction section 114, the direction detection section 115, and the collision determination section 116, may be configured as hardware such as an electrical circuit.

In the same manner, in the description of the second embodiment, the collision determination ECU 1A functionally includes the first information generation section 101, the transmission control section 102, the reception control section 103, the reception time acquisition section 104, the distance calculation section 105A, the time difference calculation section 106, the second information generation section 107A, the first determination section 108, the time difference storage section 110A, the time difference recording section 112A, the second determination section 113A, the collision prediction section 114, the direction detection section 115, the collision determination section 116, and the like. However, at least one of the functional sections including the first information generation section 101, the transmission control section 102, the reception control section 103, the reception time acquisition section 104, the distance calculation section 105A, the time difference calculation section 106, the second information generation section 107A, the first determination section 108, the time difference storage section 110A, the time difference recording section 112A, the second determination section 113A, the collision prediction section 114, the direction detection section 115, and the collision determination section 116, may be configured as hardware such as an electrical circuit.

(B) In the description of the first embodiment, the collision determination ECU 1 includes the inhibition section 109, and in the description of the second embodiment, the collision determination ECU 1A does not include a functional section corresponding to the inhibition section 109. However, instead, the collision determination ECU 1 may not include the inhibition section 109 while the collision determination ECU 1A may include a functional section corresponding to the inhibition section 109. If the inhibition section 109 (or a functional section corresponding to the inhibition section 109) is provided, the amount of communication between vehicles can be reduced. This effect can be confirmed by referring to the comparison between FIGS. 4, 5, and FIGS. 11, 12.

(C) In the description of the first and second embodiments, the second information generation section 107 and the second information generation section 107A generate the second output information FA2*m* including the first time difference information representing the first time difference ΔT1. However, the second information generation section 107 and the second information generation section 107A may generate the second output information FA2*m* including the reception time TAn and the other vehicle time TBh (or the other vehicle time TCj). In this case, by receiving the first output information and the second output information, time information (hereinafter referred to as reception time information) of a time point, in the timer 4 of the other vehicle VCB (or the other vehicle VCC), at which information from the own vehicle VCA is received, and time information (hereinafter referred to as transmission time information) of a time point, in the timer 4 of the other vehicle VCB (or the other vehicle VCC), at which information to the own vehicle VCA is transmitted, can be acquired. Consequently, the distance LB (or the distance LC) can be obtained with an increased accuracy.

For example, the time measurement lag ΔT0 between the timer 4 of the other vehicle VCB (or the other vehicle VCC) and the timer of the own vehicle VCA can be obtained statistically (or by learning), using a history of the reception time information and the transmission time information in the timer 4 of the other vehicle VCB (or the other vehicle VCC) and a history of the transmission time information and the reception time information in the timer 4 of the own vehicle. In this case, the time measurement lag ΔT0 can be obtained with an increased accuracy.

INDUSTRIAL APPLICABILITY

The present invention is applicable to, for example, a distance detection device that is mounted in a vehicle and detects a distance to an other vehicle through information communicated with the other vehicle. The present invention is also applicable to, for example, a collision determination device that is mounted in a vehicle and determines a possibility of a collision with an other vehicle through information communicated with the other vehicle.

REFERENCE SIGNS LIST

100 collision determination device (distance detection device)
1 collision determination ECU
101 first information generation section (first information generation part)
102 transmission control section (a part of transmission part)
103 reception control section (a part of reception part)
104 reception time acquisition section (reception time acquisition part)
105 distance calculation section (distance calculation part)
106 time difference calculation section (time difference calculation part)
107 second information generation section (second information generation part)
108 first determination section (first determination part)
109 inhibition section (inhibition part)
110 time measurement lag storage section (time measurement lag storage part)
111 time measurement lag calculation section (time measurement lag calculation part)
112 time measurement lag recording section (time measurement lag recording part)
113 second determination section (second determination part)
114 collision prediction section (collision prediction part)
115 direction detection section (direction detection part)
116 collision determination section (collision determination part)
1A collision determination ECU
101 first information generation section (first information generation part)
102 transmission control section (a part of transmission part)
103 reception control section (a part of reception part)
104 reception time acquisition section (reception time acquisition part)
105A distance calculation section (distance calculation part)
106 time difference calculation section (time difference calculation part)
107A second information generation section (second information generation part)
108 first determination section (first determination part)
110A time difference storage section (time difference storage part)
112A time difference recording section (time difference recording part)
113A second determination section (second determination part)
114 collision prediction section (collision prediction part)
115 direction detection section (direction detection part)
116 collision determination section (collision determination part)
2 transmission section (a part of transmission part)
21 DA converter
22 transmitter circuit
23 transmitting antenna
3 reception section (a part of reception part)
31 AD converter
32 receiver circuit
33 (331, 332) receiving antenna
4 timer (time measurement part)

The invention claimed is:

1. A distance detection device which is mounted in a vehicle and detects a distance to an other vehicle through information communicated with the other vehicle, the distance detection device comprising:

a time measurement part having a time measurement function;

a first information generation part for generating first output information which is information to be transmitted to the other vehicle, by acquiring time information from the time measurement part and associating own vehicle time information representing an own vehicle time, which is the acquired time information, with own vehicle identification information, which is predetermined identification information of an own vehicle;

a transmission part for, each time the first information generation part generates the first output information, transmitting the generated first output information by broadcasting;

a reception part for receiving own vehicle time information representing an own vehicle time and own vehicle identification information, which are included in first output information transmitted from the other vehicle by broadcasting, as other vehicle time information which represents an other vehicle time of the other vehicle and other vehicle identification information which is identification information of the other vehicle, respectively;

a reception time acquisition part for, when the reception part receives the first output information from the other vehicle, acquiring, from the time measurement part, time information as reception time information representing a reception time;

a distance calculation part for obtaining a distance to the other vehicle, based on the other vehicle time information included in the first output information received by the reception part, and the reception time information acquired by the reception time acquisition part, when the reception part receives the first output information of the other vehicle which has been transmitted from the other vehicle to the own vehicle in response to the first transmission information of the own vehicle transmitted from the own vehicle to the other vehicle; and a time difference calculation part for, when the reception part receives the first output information from the other vehicle, obtaining, as a first time difference, a time difference resulting from the other vehicle time included in the first output information being subtracted from the reception time acquired by the reception time acquisition part, wherein the distance calculation part obtains a distance to the other vehicle, by exchanging, with the other vehicle, first time difference information representing the first time difference obtained by the time difference calculation part.

2. The distance detection device according to claim 1, wherein, when the reception part receives the first output information from the other vehicle, the transmission part transmits, by broadcasting, the reception time information acquired by the reception time acquisition part.

3. The distance detection device according to claim 1, comprising a time difference calculation part for, when the reception part receives the first output information from the other vehicle, obtaining, as a first time difference, a time difference resulting from the other vehicle time included in the first output information being subtracted from the reception time acquired by the reception time acquisition part, wherein the distance calculation part obtains a distance to the other vehicle, based on first time difference information representing the first time difference obtained by the time difference calculation part.

4. A distance detection device which is mounted in a vehicle and detects a distance to an other vehicle through information communicated with the other vehicle, the distance detection device comprising:

a time measurement part having a time measurement function;

a first information generation part for generating first output information which is information to be transmitted to the other vehicle, by acquiring time information from the time measurement part and associating own vehicle time information representing an own vehicle time, which is the acquired time information, with own vehicle identification information, which is predetermined identification information of an own vehicle;

a transmission part for, each time the first information generation part generates the first output information, transmitting the generated first output information by broadcasting;

a reception part for receiving own vehicle time information representing an own vehicle time and own vehicle identification information, which are included in first output information transmitted from the other vehicle by broadcasting, as other vehicle time information which represents an other vehicle time of the other vehicle and other vehicle identification information which is identification information of the other vehicle, respectively;

a reception time acquisition part for, when the reception part receives the first output information from the other vehicle, acquiring, from the time measurement part, time information as reception time information representing a reception time;

a distance calculation part for obtaining a distance to the other vehicle, based on the other vehicle time information included in the first output information received by the reception part, and the reception time information acquired by the reception time acquisition part, when the reception part receives the first output information of the other vehicle which has been transmitted from the other vehicle to the own vehicle in response to the first transmission information of the own vehicle transmitted from the own vehicle to the other vehicle;

a time difference calculation part for, when the reception part receives the first output information from the other vehicle, obtaining, as a first time difference, a time difference resulting from the other vehicle time included in the first output information being subtracted from the reception time acquired by the reception time acquisition part, the distance calculation part obtaining a distance to the other vehicle, based on first time difference information representing the first time difference obtained by the time difference calculation part; and a second information generation part for, when the reception part receives the first output information, generating second output information, by associating the first time difference information representing the first time difference obtained by the time difference calculation part, with the other vehicle identification information received by the reception part, wherein:

when the second information generation part generates the second output information, the transmission part transmits, by broadcasting or communication, the generated second output information simultaneously with the first output information generated by the first information generation part;

the reception part receives first output information and second output information transmitted from the other vehicle by broadcasting or communication; and when the reception part receives the first output information and the second output information from the other vehicle, the reception time acquisition part acquires, from the time measurement part, time information as reception time information representing a reception time.

5. The distance detection device according to claim 4, comprising a first determination part for, when the reception part receives the second output information from the other vehicle, determining whether or not other vehicle identification information included in the received second output information is coincident with the own vehicle identification information, wherein when the first determination part determines that the other vehicle identification information is coincident with the own vehicle identification information, the distance calculation part obtains a distance to the other vehicle, based on second time difference information representing a second time difference, which is first time difference information included in the second output information received by the reception part.

6. The distance detection device according to claim 5, comprising:

a time difference storage part for storing therein the second time difference information included in the second output information transmitted from the other vehicle, so as to associate the second time difference information with the other vehicle identification information; and a time difference recording part for, when the first determination part determines that the other vehicle identification information is coincident with the own vehicle identification information, recording, in the time difference storage part, the second time difference information included in the second output information received by the reception part so as to associate the second time difference information with the other vehicle identification information included in the first output information received simultaneously with the second output information.

7. The distance detection device according to claim 5, wherein the distance calculation part obtains a distance to the other vehicle, by: obtaining an average value of the first time difference obtained by the time difference calculation part and the second time difference included in the second output information received by the reception part; and multiplying the obtained average value by the speed of light.

8. The distance detection device according to claim 5, comprising:

a time measurement lag storage part for storing therein time measurement lag information representing a time measurement lag, which is a difference in measurement time between a time measurement part mounted in the other vehicle and the time measurement part mounted in the own vehicle, so as to associate the time measurement lag information with the other vehicle identification information of the other vehicle;

a time measurement lag calculation part for, when the first determination part determines that the other vehicle identification information is coincident with the own vehicle identification information, obtaining, as the time measurement lag, one half of a difference resulting from the first time difference obtained by the time difference calculation part being subtracted from the second time difference included in the second output information received by the reception part; and a time measurement lag recording part for, when the first determination part determines that the other vehicle identification information is coincident with the own vehicle identification information, recording, in the time measurement lag storage part, the time measurement lag information representing the time measurement lag obtained by the time measurement lag calculation part so as to associate the time measurement lag information with the other vehicle identification information included in the first output information received simultaneously with the second output information.

9. The distance detection device according to claim 8, comprising an inhibition part for, when the first determination part determines that the other vehicle identification information is coincident with the own vehicle identification information, performing at least one of determinations of:

whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information received simultaneously with the second output information received by the reception part, is equal to or greater than a second predetermined number of times which is not less than 1, wherein the inhibition part inhibits the second information generation part from generating the second output information, when at least one of the determinations that the number of times is equal to or greater than the first predetermined number of times and that the number of times is equal to or greater than the second predetermined number of times is made.

10. The distance detection device according to claim 8, comprising a second determination part for, when the reception part receives the first output information from the other vehicle, determining whether or not the other vehicle identification information included in the received first output information is coincident with any of the other vehicle identification information stored in the time measurement lag storage part, wherein when the second determination part determines that the other vehicle identification information is coincident with any of the other vehicle identification information stored in the time measurement lag storage part, the distance calculation part reads, from the time measurement lag storage part, the time measurement lag information corresponding to the other vehicle identification information included in the first output information received by the reception part, and obtains a distance to the other vehicle based on the time measurement lag information which has been read.

11. The distance detection device according to claim 10, wherein the distance calculation part obtains a distance to the other vehicle by: obtaining a sum of the first time difference obtained by the time difference calculation part and the time measurement lag read from the time measurement lag storage part; and multiplying the obtained sum by the speed of light.

12. The distance detection device according to claim 6, comprising an inhibition part for, when the first determination part determines that the other vehicle identification information is coincident with the own vehicle identification information, performing at least one of determinations of:

whether or not the number of times it is determined that the other vehicle identification information is coincident with the own vehicle identification information, is equal to or greater than a first predetermined number of times which is not less than 2; and whether or not the number of times the transmission part has transmitted the second output information that includes, as the other vehicle identification information, the own vehicle identification information included in the first output information received simultaneously with the second output information received by the reception part, is equal to or greater than a second predetermined number of times which is not less than 1, wherein the inhibition part inhibits the second information generation part from generating the second output information, when at least one of the determinations that the number of times is equal to or greater than the first predetermined number of times and that the number of times is equal to or greater than the second predetermined number of times is made.

13. The distance detection device according to claim 6, comprising a second determination part for, when the reception part receives the first output information from the other vehicle, determining whether or not the other vehicle identification information included in the received first output information is coincident with any of the other vehicle identification information stored in the time difference storage part, wherein when the second determination part determines that the other vehicle identification information is coincident with any of the other vehicle identification information stored in the time difference storage part, the distance calculation part reads, from the time difference storage part, the second time difference information corresponding to the other vehicle identification information included in the first output information received by the reception part, and obtains a distance to the other vehicle based on the second time difference information which has been read.

14. The distance detection device according claim 13, wherein the distance calculation part obtains a distance to the other vehicle by: obtaining an average value of the first time difference obtained by the time difference calculation part and the second time difference read from the time difference storage part; and multiplying the obtained average value by the speed of light.

15. A collision determination device which is mounted in a vehicle and determines a possibility of a collision with an other vehicle through information communicated with the other vehicle, the collision determination device comprising:

a time measurement part having a time measurement function;

a first information generation part for generating first output information which is information to be transmitted to the other vehicle, by acquiring time information from the time measurement part and associating own vehicle time information representing an own vehicle time, which is the acquired time information, with own vehicle identification information, which is predetermined identification information of an own vehicle;

a transmission part for, each time the first information generation part generates the first output information, transmitting the generated first output information by broadcasting;

a reception part for receiving own vehicle time information representing an own vehicle time and own vehicle identification information, which are included in first output information transmitted from the other vehicle by broadcasting, as other vehicle time information which represents an other vehicle time of the other vehicle and other vehicle identification information which is identification information of the other vehicle, respectively;

a reception time acquisition part for, when the reception part receives the first output information from the other vehicle, acquiring, from the time measurement part, time information as reception time information representing a reception time;

a distance calculation part for obtaining a distance to the other vehicle, based on the other vehicle time information included in the first output information received by the reception part, and the reception time information acquired by the reception time acquisition part, when the reception part receives the first output information of the other vehicle which has been transmitted from the other vehicle to the own vehicle in response to the first transmission information of the own vehicle transmitted from the own vehicle to the other vehicle;

a collision determination part for determining whether or not there is a high possibility of a collision with the other vehicle, based on the distance obtained by the distance calculation part; and a time difference calculation part for, when the reception part receives the first output information from the other vehicle, obtaining, as a first time difference, a time difference resulting from the other vehicle time included in the first output information being subtracted from the reception time acquired by the reception time acquisition part, wherein the distance calculation part obtains a distance to the other vehicle, by exchanging, with the other vehicle, first time difference information representing the first time difference obtained by the time difference calculation part.

16. The collision determination device according to claim 15, comprising a collision prediction part for estimating a collision time at which a collision with the other vehicle is predicted to occur, based on the distance obtained by the distance calculation part, wherein the collision determination part determines whether or not there is a high possibility of a collision with the other vehicle, based on the collision time estimated by the collision prediction part.

17. The collision determination device according to claim 16, comprising a direction detection part for obtaining, based on the own vehicle as a reference, a direction in which the other vehicle, to which the distance has been obtained by the distance calculation part, is present, wherein the collision prediction part determines whether or not there is a high possibility of a collision with the other vehicle, based on the collision time estimated by the collision prediction part and the direction in which the other vehicle is present, which has been obtained by the direction detection part.

18. The collision determination device according to claim 16, wherein the collision prediction part estimates the collision time, based on a change with time of the distance obtained by the distance calculation part.

19. The collision determination device according to claim 17, wherein the collision determination part determines that there is a high possibility of a collision with the other vehicle, when a time period until the collision time is equal to or less than a predetermined threshold value and in addition an azimuth change rate, which indicates the degree of change, per unit time, of the direction in which the other vehicle is present, is equal to or less than a predetermined threshold value.

20. The collision determination device according to claim 17, wherein the direction detection part obtains the direction in which the other vehicle is present, based on a direction from which a radio wave signal of the other vehicle comes.

21. The collision determination device according to claim 20, comprising a plurality of antennas for receiving radio wave signals, wherein the direction detection part obtains a direction from which the radio wave signals of the other vehicle come, based on a phase difference between the radio wave signals received from the other vehicle by the plurality of antennas.

* * * * *